United States Patent
Minegishi et al.

(10) Patent No.: US 12,555,278 B2
(45) Date of Patent: Feb. 17, 2026

(54) REVISION APPARATUS, RECORDING MEDIUM, AND DESIGN REVISION METHOD

(71) Applicant: Konica Minolta, Inc., Tokyo (JP)

(72) Inventors: Natsuko Minegishi, Hachioji (JP); Shoichi Uratani, Hino (JP); Satoru Inoue, Kunitachi (JP)

(73) Assignee: KONICA MINOLTA, INC., Tokyo (JP)

( * ) Notice: Subject to any disclaimer, the term of this patent is extended or adjusted under 35 U.S.C. 154(b) by 66 days.

(21) Appl. No.: 18/503,664

(22) Filed: Nov. 7, 2023

(65) Prior Publication Data

US 2024/0169606 A1  May 23, 2024

(30) Foreign Application Priority Data

Nov. 22, 2022  (JP) ................ 2022-186103

(51) Int. Cl.
- G06T 11/00 (2006.01)
- G06F 30/12 (2020.01)
- G06T 7/90 (2017.01)

(52) U.S. Cl.
CPC ............ G06T 11/001 (2013.01); G06F 30/12 (2020.01); G06T 7/90 (2017.01); *G06T 2207/10024* (2013.01); *G06T 2207/20092* (2013.01)

(58) Field of Classification Search
None
See application file for complete search history.

(56) References Cited

U.S. PATENT DOCUMENTS

| | | | |
|---|---|---|---|
| 9,715,638 B1* | 7/2017 | Chen | G06V 10/26 |
| 2008/0129750 A1* | 6/2008 | Voliter | H04N 1/622 |
| | | | 345/593 |
| 2010/0086200 A1 | 4/2010 | Stankiewicz et al. | |
| 2017/0193324 A1 | 7/2017 | Chen et al. | |

FOREIGN PATENT DOCUMENTS

| | | | |
|---|---|---|---|
| JP | 2007280050 A | 10/2007 | |
| JP | 2015011496 A | 1/2015 | |
| KR | 20220117545 A | 8/2022 | |

OTHER PUBLICATIONS

KIPO Request for the Submission of an Opinion; for corresponding KR10-2023-0138961; Issued Dec. 30, 2025.

* cited by examiner

*Primary Examiner* — Carl Adams
(74) *Attorney, Agent, or Firm* — CANTOR COLBURN LLP

(57) ABSTRACT

A design revision apparatus includes a hardware processor that: applies, to an input image, attentional property evaluation that evaluates a portion easily attracting visual attention; performs impression evaluation that estimates an impression given by the input image to an observer; and combines a result of the attentional property evaluation with a result of the impression evaluation and presents a design revision proposal about an attentional property or an impression of the input image.

12 Claims, 19 Drawing Sheets

FIG. 2

| IMPRESSION WORD | FEATURE | | | | | | | | | |
|---|---|---|---|---|---|---|---|---|---|---|
| | COLOR 1 | | | COLOR 2 | | | COLOR 3 | | | |
| | R GRADATION VALUE | G GRADATION VALUE | B GRADATION VALUE | R GRADATION VALUE | G GRADATION VALUE | B GRADATION VALUE | R GRADATION VALUE | G GRADATION VALUE | B GRADATION VALUE | |
| HOMEY | R101 | G101 | B101 | R102 | G102 | B102 | R103 | G103 | B103 | |
| COMFORTABLE | R201 | G201 | B201 | R202 | G202 | B202 | R203 | G203 | B203 | |
| ACTIVE | R301 | G301 | B301 | R302 | G302 | B302 | R303 | G303 | B303 | |
| ... | ... | ... | ... | ... | ... | ... | ... | ... | ... | |
| ... | ... | ... | ... | ... | ... | ... | ... | ... | ... | |

151

| (R11, G11, B11) | (R12, G12, B12) | ... | (R1n, G1n, B1n) |
|---|---|---|---|
| (R21, G21, B21) | (R22, G22, B22) | ... | (R2n, G2n, B2n) |
| ⋮ | ⋮ | ⋮ | ⋮ |
| ⋮ | ⋮ | ⋮ | ⋮ |
| (Rm1, Gm1, Bm1) | (Rm2, Gm2, Bm2) | ... | (Rmn Gmn, Bmn) |

REVISION APPARATUS, RECORDING MEDIUM, AND DESIGN REVISION METHOD

CROSS-REFERENCE TO RELATED APPLICATIONS

The present invention claims priority under 35 U.S.C. § 119 to Japanese Application, 2022-186103, filed on Nov. 22, 2022, the entire contents of which being incorporated herein by reference.

BACKGROUND

TECHNICAL FIELD

The present invention relates to a design revision apparatus, a recording medium, and a design revision method.

DESCRIPTION OF THE RELATED ART

In general, images with various designs are used for packages and advertisements of articles. Distinct parts, and impressions given for people vary with respect to the designs.

To evaluate the distinctness of a design image, a heat map (saliency map) that quantifies the attentional property (saliency) of each pixel of the image and visualizes the magnitude of the degree of distinctness with colors has been used. Hereinafter, a technique of analyzing a part easily attracting visual attention and the attentional property in a design image is called attentional property evaluation. The attentional property evaluation can contribute to an improvement proposal for making a part intended to be distinct actually distinct in the design image.

A technique has been known that estimates and evaluates an impression perceptively given to an observer by an evaluation target image, by using a database associating image features with impressions given to people by an image and comparing the feature of the evaluation target image with an image feature in the database. Hereinafter, the technique of estimating and evaluating the impression of an image is called impression evaluation.

If a part intended to be distinct is not distinct in a design image, the attentional property evaluation can revise a design, thus achieving change that makes the part intended to be distinct actually distinct. For example, as an improvement method using a publicly known saliency map, improvement of the contrast between a target region intended to be made distinct and a background region can be proposed.

As the attentional property evaluation technique, for example, a system has been proposed that uses a visual attention modeling technique and evaluates an object and the like that easily attract attention (see US 2010/0086200A).

SUMMARY

Unfortunately, only with the attentional property evaluation, the distinctness serves as a sole evaluation reference. Consequently, manual, or automatic change of a design for the sake of attentional property improvement sometimes causes large change in impression of the design from an initial state. Accordingly, the impression of an article intended to be given by the design deviates from the concept of the article, possibly reducing the effect of the article promotion.

The impression of an article is sometimes intended to be changed while the attentional property is maintained in a state where an appealing point in a design image can sufficiently be secured. For example, there are situations where a line of articles is developed, through change in impression of packages on a season-by-season basis with the same trade name.

The present invention has been made in view of the problem in the conventional art described above and has an object to facilitate improvement in attentional property or impression of an image.

To achieve at least one of the abovementioned objects, according to an aspect of the present invention, a design revision apparatus reflecting one aspect of the present invention includes a hardware processor that: applies, to an input image, attentional property evaluation that evaluates a portion easily attracting visual attention; performs impression evaluation that estimates an impression given by the input image to an observer; and combines a result of the attentional property evaluation with a result of the impression evaluation, and presents a design revision proposal about an attentional property or an impression of the input image.

To achieve at least one of the abovementioned objects, according to an aspect of the present invention, a recording medium reflecting one aspect of the present invention is a non-transitory computer-readable recording medium storing a program that
  causes a computer to perform:
  applying, to an input image, attentional property evaluation that evaluates a portion easily attracting visual attention;
  performing impression evaluation that estimates an impression given by the input image to an observer; and
  combining a result of the attentional property evaluation with a result of the impression evaluation to present a design revision proposal about an attentional property or an impression of the input image.

To achieve at least one of the abovementioned objects, according to an aspect of the present invention, a design revision method reflecting one aspect of the present invention
  causes a hardware processor to:
  apply, to an input image, attentional property evaluation that evaluates a portion easily attracting visual attention;
  perform impression evaluation that estimates an impression given by the input image to an observer; and
  combine a result of the attentional property evaluation with a result of the impression evaluation to present a design revision proposal about an attentional property or an impression of the input image.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention, wherein:

FIG. 2 shows an example of an impression association table;

DETAILED DESCRIPTION

Hereinafter, one or more embodiments of the present invention will be described with reference to the drawings. However, the scope of the invention is not limited to the disclosed embodiments.

First Embodiment

First, a first embodiment of the present invention is described.

Figure 1:
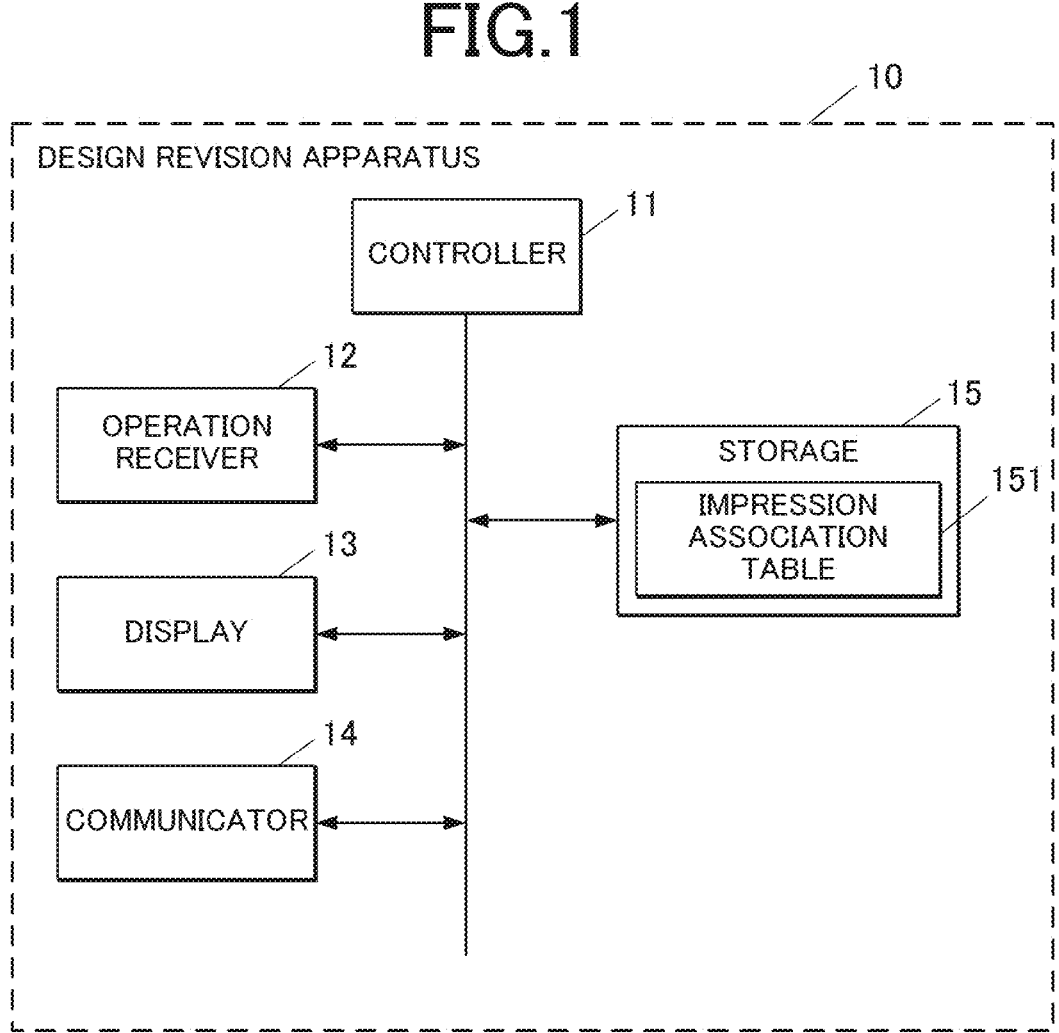
FIG. 1 shows a block diagram of a functional configuration of a design revision apparatus according to a first embodiment of the present invention.

FIG. 1 shows a functional configuration of a design revision apparatus 10 according to the first embodiment. As shown in FIG. 1, the design revision apparatus 10 includes a controller 11 (hardware processor), an operation receiver 12, a display 13, a communicator 14, and a storage 15, which are connected by a bus. The design revision apparatus 10 is made up of a computer apparatus, such as a PC (Personal Computer).

The controller 11 includes a central processing unit (CPU), and a random access memory (RAM), and comprehensively controls processing operation of each component of the design revision apparatus 10. Specifically, the CPU reads various processing programs stored in the storage 15, loads the processing programs to the RAM, and performs various processes in cooperation with the programs.

The operation receiver 12, which includes a keyboard including cursor keys, character and numeric input keys, and various function keys, and a pointing device, such as a mouse, outputs an operation signal input through key operation on the keyboard and mouse operation, to the controller 11. The operation receiver 12 may include a touch panel layered over the surface of the display 13, accept an input by a user on the display screen, and output an operation signal in accordance with the position of touch operation to the controller 11.

The display 13, which includes a monitor, such as a liquid crystal display (LCD), displays various screens in accordance with an instruction of a display signal input from the controller 11.

The communicator 14 includes a network interface, transmits, and receives data to and from an external apparatus connected to a communication network, such as a local area network (LAN), a wide area network (WAN), and the Internet.

The storage 15 includes a hard disk drive (HDD), and a nonvolatile semiconductor memory, and stores various processing programs, and data required to execute the programs.

The storage 15 stores an impression association table 151 (database). The impression association table 151 associates impression words respectively with features of images (image features) that provide impressions indicated by the impression words. The feature of an image is a value indicating the feature property of the image and can be obtained from the image or supplementary information on the image.

The impression association table 151 is created in advance for each of a plurality of sample images by evaluating impressions of the sample images with a plurality of test subjects including design experts and laypeople. The impression association table 151 associates impression words (adjectives, adjective verbs, figurative expression, etc.) obtained by evaluating the impressions of the sample images, respectively with the features of the sample images. The impression words included in the impression association table 151 indicate average impressions by all the test subjects.

By referring to the impression association table 151, the impression given by an image serving as an evaluation target from the feature of this image.

FIG. 2 shows an example of the impression association table 151. The impression association table 151 shown in FIG. 2 associates the impression words indicating impressions given by an image, with a combination of colors (colors 1 to 3) as the feature of the image. Each color is indicated by RGB gradation values.

Note that the impression association table 151 may include a feature other than the color, as a feature of the image associated with each impression word.

Here, the case of using the impression association table 151 is described. Alternatively, a correlation formula created based on an association relationship between impression words of sample images and respective features of the sample images may be used.

For each of the sample images, a machine learning model trained with the feature of the sample image being adopted as an input and with the impression words of the sample image evaluated by a plurality of test subjects being adopted as an output, may be used.

The controller 11 applies, to an input image, attentional property evaluation that evaluates a portion easily attracting visual attention. That is, the controller 11 functions as an attentional property evaluation device.

For example, the controller 11 performs a saliency map achieving process that quantifies the degree of distinctness (i.e., saliency) of each pixel of an input image.

The saliency map achieving process is image processing that represents each pixel included in the image by a value (attentional property score value) indicating the degree of distinctness of the pixel portion. Specifically, the saliency map achieving process represents a portion having a color contrast in a red-green direction and a yellow-blue direction, a portion having a luminance contrast, and a portion having a line component (edge) coinciding with a predetermined direction (for example, every 45 degrees from 0 to 315 degrees, in a case of defining degrees similar to that in FIG. 3 described later), as distinct portions (portions that can be easily visually identified), with high values.

Presence of the color contrast in the red-green direction corresponds to, for example, a fact that the difference of values indicating colors in the red-green direction between adjacent pixels has a predetermined value or higher.

Presence of the color contrast in the yellow-blue direction corresponds to, for example, a fact that the difference of values indicating colors in the yellow-blue direction between adjacent pixels has a predetermined value or higher.

Presence of the luminance contrast corresponds to, for example, a fact that the difference of values indicating luminance between adjacent pixels has a predetermined value or higher.

As for the angles indicating predetermined directions, a pair of 0 and 180 degrees (lateral direction), a pair of 45 and 225 degrees (oblique direction pointing to the upper right), a pair of 90 and 270 degrees (vertical direction), and a pair of 135 and 315 degrees (oblique direction pointing to the lower right) respectively correspond to line components in the same directions.

The controller 11 performs impression evaluation that estimates an impression given by the input image to an observer. That is, the controller 11 functions as an impression evaluation device.

As the impression evaluation, a first impression evaluation and a second impression evaluation are used.

First Impression Evaluation

The first impression evaluation is a process of estimating the impression of an evaluation target image by referring to association information that associates impression words respectively with image features.

The controller 11 analyzes the feature of the evaluation target image.

The controller 11 calculates the similarity between the image feature associated with each impression word, and the feature of the evaluation target image. The controller 11 outputs the impression word associated with the image feature whose calculated similarity is high, and the numerical value of the similarity, as the result of the impression evaluation.

Among the features associated with the impression words, image features having higher similarities with the feature of the evaluation target image to a predetermined rank number, image features having higher similarities with the feature of the evaluation target image than a predetermined threshold, or the like may be used as "image features having high similarities".

As described above, the controller 11 estimates the impression given by the evaluation target image from the feature of the evaluation target image, based on the impression association table 151 that associates the impression given by the image with the feature of the image. The controller 11 includes, in an impression evaluation result, the similarity (%) between the image feature corresponding to the impression word and the feature of the evaluation target image, with respect to the impression word corresponding to the evaluation target image.

The image features used to evaluate the impression of the evaluation target image include the color, luminance, brightness, shape, complexity of the image, blank space ratio, character area ratio, and jump ratio (character string size ratio in the image).

The "color" is a numerical value represented by color information included in image data. The "color" is represented by, for example, R (Red), G (Green), and B (Blue) gradation values. Any value, such as of L*a*b* or CMYK, may be adopted only if the value represents the color.

The "luminance" is a value obtained, for example, by converting R, G, and B data items into a luminance value. An environment where the image serving as an evaluation target is observed by the observer may be estimated, a coefficient required for conversion may be determined, and the luminance may be calculated.

The "brightness" is one of attributes of the color and is a value representing the brightness property of an object color.

Figures 3, 4:
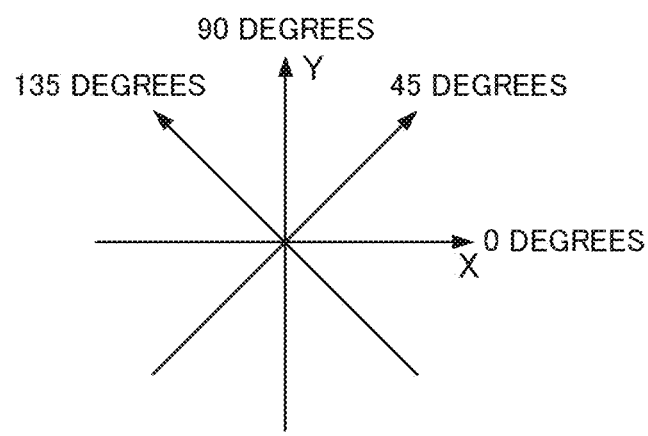
FIG. 3 is a diagram for illustrating a direction or an angle on an image.
FIG. 4 is a diagram for illustrating a pixel value of each of pixels constituting an image.

The "shape" is a feature representing the shape extracted from the evaluation target image. Here, as shown in FIG. 3, an X-axis (horizontal direction or lateral direction) and a Y-axis (vertical direction) are defined for the image. Provided that the angle coinciding with the X-axis is defined as 0 degrees, a feature indicating which values among R, G, and B of pixels constituting the image are continuously arranged in a direction coinciding with any of 0, 45, 90, and 135 degrees is used as "shape". For example, the image is grayscale-transformed and is represented only by a luminance distribution, a convolution operation is then applied to a numerical value array of gradation values of the image, and a numerical value matrix serving as a Gabor filter coinciding with any of angles that are 0, 45, 90, and 135 degrees, thereby generating an image where a portion coinciding with the angle is emphasized. The pixel values of the thus obtained image serves as features representing the shape.

The "complexity" is a value representing the degree of occupation of a line recognized by people as a contour (edge component) in the image and corresponds to what is an amount of lineal drawing or the like. For example, for the distribution of gradation values of pixels constituting the image data, the fractal dimension is calculated based on box counting, and the calculated fractal dimension is adopted as the complexity. In this case, the minimum value of the complexity is one. The more crowded the contours of the image are, the larger the value of the complexity is.

The "blank space ratio" is a value representing the degree of occupation of a region recognized by people as a blank space in the image. For example, regions recognized as objects in the image are extracted, and the other areas are defined as blank spaces. The method of extracting regions recognized as objects may use a result of machine learning or be manual designation of objects on the evaluation target image.

Note that the blank space ratio has a negative correlation with the complexity. It can sometimes be determined that the smaller the complexity is, the higher the blank space ratio is.

The "character area ratio" is a ratio of the area of a region occupied with characters to the entire image.

The "jump ratio (character string size ratio)" is the ratio of the size of the character string in the image where a sequentially arranged non-braking character string is extracted as a chunk from characters in the image, the area of the region occupied with the extracted chunk of the character string is assumed as the size of the character string in the image.

For example, the jump ratio of the character string having the maximum size in a certain image is assumed as 100, and the sizes of the other character strings are represented as ratios.

The method of extracting the character string may use a result of machine learning. In a case of image data having a file format that stores character data separately from images, the method may extract data portions recorded as characters.

The "color", which is a feature of the image, may be a color as an average over the entire image, or a color combination pattern.

The "color as an average over the entire image" is a color obtained by averaging pixel values (RGB gradation values) of pixels constituting the image. For example, as shown in FIG. 4, provided that the pixel value of each of pixels (m in the vertical direction x n in the lateral direction) constituting the image is (Rij, Gij, Bij), the averaged color (R, G, B) is obtained by the following expressions (1) to (3).

[Expression 1]
$$R = \left(\sum_{i=1}^{m}\sum_{j=1}^{n} Rij\right)/m \cdot n \qquad \text{Expression (1)}$$

[Expression 2]
$$G = \left(\sum_{i=1}^{m}\sum_{j=1}^{n} Gij\right)/m \cdot n \qquad \text{Expression (2)}$$

[Expression 3]
$$B = \left(\sum_{i=1}^{m}\sum_{j=1}^{n} Bij\right)/m \cdot n \qquad \text{Expression (3)}$$

The "color combination pattern" is a combination of multiple colors (e.g., three, five, ten colors, etc.) obtained by performing a subtractive color process of assuming similar colors in the image as the same color. The "color combination pattern" may include the area ratio of each of colors included in the pattern.

In the following description, the color combination pattern is used as a feature for evaluating the impression of the image in the first impression evaluation.

The controller 11 extracts the color combination pattern from the image by applying the subtractive color process to the evaluation target image. The controller 11 then refers to the impression association table 151, obtains the impression word corresponding to the combination with a high similarity with the color combination pattern of the evaluation target image, and adopts the impression word as the impression of the evaluation target image.

Second Impression Evaluation

The second impression evaluation is a process of identifying a hue distribution pattern closest to that of the evaluation target image among hue distribution patterns conforming to color harmony (in particular, the principle of order).

The second impression evaluation estimates the impression of whether the colors of the evaluation target image are harmonized.

The controller 11 determines whether the evaluation target image has a color combination conforming to color harmony or not. For example, the controller 11 determines whether or not the colors constituting the evaluation target image is in a color combination conforming to any of Judd's four principles (principle of order, principle of familiarity, principle of similarity, and principle of unambiguity).

In particular, the controller 11 determines whether the evaluation target image has a hue distribution conforming to the principle of order in color harmony or not. For example, the controller 11 determines whether the hue distribution of the evaluation target image conforms to hue distribution patterns, such as identity, analogy, intermediate, opponent, diad, triad, tetrad, pentad, and hexad or not.

The method of determining whether the evaluation target image has a hue distribution conforming to the principle of order of color harmony or not can use, for example, a technique described in Cohen-Or, Daniel, et al. "Color harmonization." ACM SIGGRAPH 2006 Papers. 2006. 624-630.

The controller 11 combines a result of the attentional property evaluation with a result of the impression evaluation and presents a design revision proposal about the attentional property or the impression of the input image. That is, the controller 11 functions as a presentation device.

The revision proposal includes information that represents revision or improvement content for the input image in characters or text, and an image obtained by revising or improving the input image.

In the first embodiment, the controller 11 presents, as the revision proposal, an attentional property improvement plan that keeps, in a predetermined range, an amount of change in impression of a revised image from that of the input image.

In the first impression evaluation, "an amount of change in impression of a revised image from that of the input image is kept in a predetermined range" is that between the input image and the revised image, the value of similarity with the image feature corresponding to the same impression word is kept in the predetermined range. Alternatively, it may be that with respect to the same impression word, the amount of change from the similarity of the input image to the similarity of the revised image is in the predetermined range.

In the second impression evaluation, "an amount of change in impression of a revised image from that of the input image is kept in a predetermined range" is that among hue distribution patterns conforming to the principle of order of color harmony, a hue distribution pattern having a hue distribution closest to that of the input image also serves as a hue distribution pattern having a hue distribution closest to that of the revised image.

The controller 11 presents an improvement plan for improving the attentional property of a region designated by the user in the input image. The controller 11 may automatically detect a predetermined region (an object region, a character region, etc.) from the input image, and present an improvement plan for improving the attentional property of the automatically detected predetermined region.

The controller 11 presents the attentional property improvement plan by changing the color of a background region in the input image so as to increase the contrast in brightness between a target region and the background region without changing the feature of the target region whose attentional property is to be improved.

Here, "without changing the feature of the target region" includes that the amount of change in feature in the target region is in the predetermined range.

The "background region" is a region serving as a background of the target region whose attentional property is to be improved. The background region may be designated by the user. Alternatively, a region corresponding to a color occupying the largest range after the subtractive color process is applied to the colors in the entire image may be adopted as the background region.

For presenting the revision proposal, the controller 11 causes the display 13 to display a revision proposal, for example. The controller 11 may transmit the revision proposal, as data, to an external apparatus, or record the data in a recording medium. The controller 11 may print and output the revision proposal by a printer or the like.

The operation receiver 12 is used to select the revision proposal that the user intends to adopt, from among the presented revision proposals. That is, the operation receiver 12 functions as a selection device. The controller 11 accepts selection of the revision proposal by the user through the operation receiver 12.

Next, operation in the design revision apparatus 10 is described.

Figure 5:
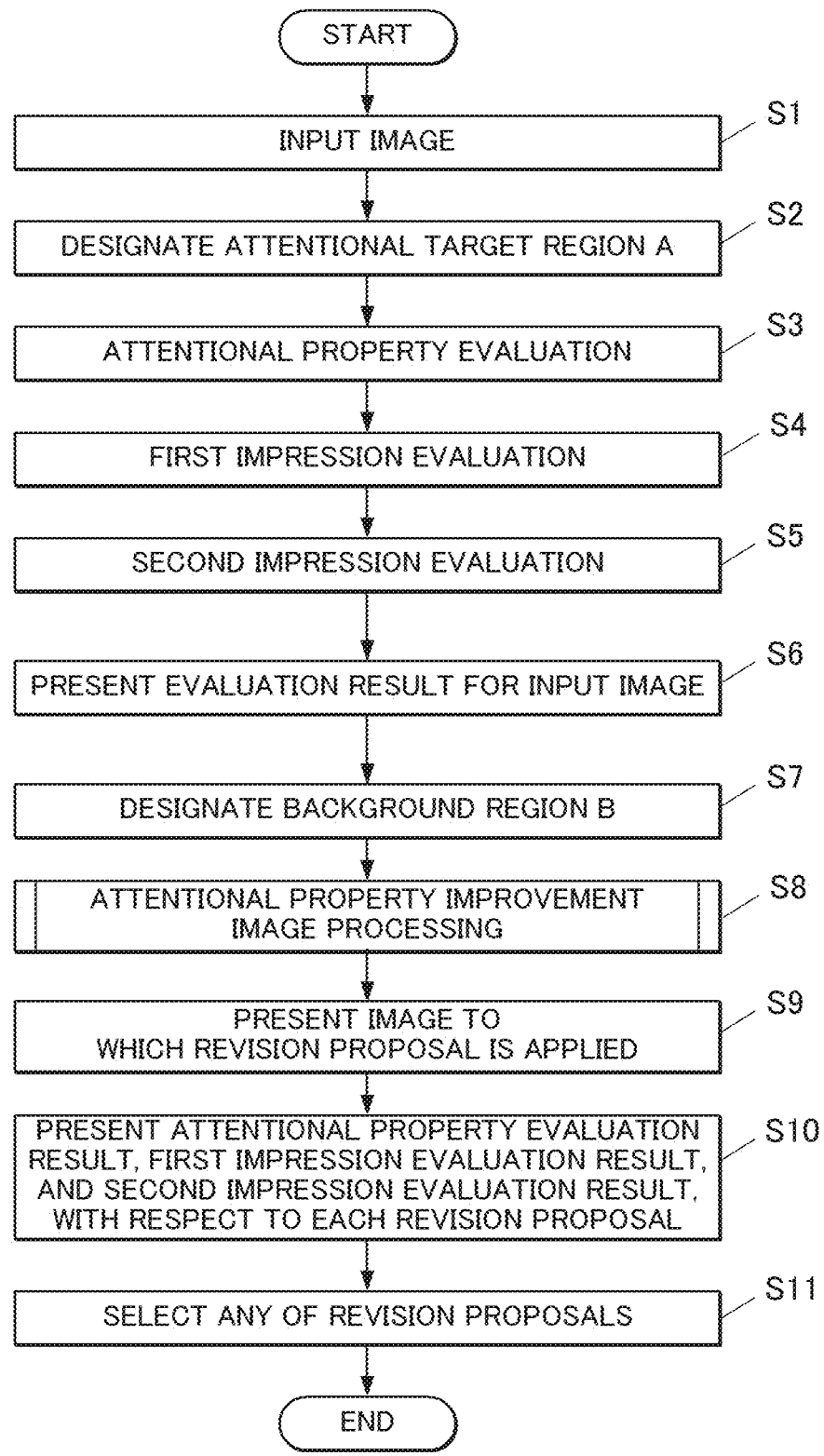
FIG. 5 is a flowchart showing a first revision proposal presentation process executed by the design revision apparatus.

FIG. 5 is a flowchart showing a first revision proposal presentation process executed by the design revision apparatus 10. This process is achieved by a software process by cooperation between the CPU of the controller 11 and the program stored in the storage 15.

The first revision proposal presentation process assumes a case where the attentional property of the appealing point is intended to be improved without largely changing the impression of the input image.

First, the controller 11 obtains a design image that is input through the communicator 14 and serves as a processing target (Step S1).

Next, the controller 11 causes the display 13 to display the input image and accepts designation of a target region (an attentional target region A) to be made distinct in the input image, by operation by the user through the operation receiver 12 (Step S2).

Note that the controller 11 may automatically detect an object region or a character region as the attentional target region A from the input image.

Next, the controller 11 applies, to an input image, attentional property evaluation that evaluates a portion easily attracting visual attention (Step S3). For example, the controller 11 quantifies the degree of distinctness of each pixel of an input image (saliency map achieving process).

Next, the controller 11 performs the first impression evaluation as impression evaluation that estimates an impression given to the observer by the input image (Step S4). Specifically, the controller 11 applies the subtractive color process that integrates colors similar to each other among the colors of pixels constituting the input image, into the same color, and obtains the ratio (area ratio) of occupation of the integrated colors (color combination pattern) in the image. The controller 11 calculates the similarity between the color combination pattern of the input image and the color combination pattern in the impression association table 151 and estimates an impression word corresponding to the color combination pattern having a high similarity, as the impression of the input image.

Next, the controller 11 performs the second impression evaluation as impression evaluation that estimates an impression given to the observer by the input image (Step S5). Specifically, the controller 11 determines whether the input image has a hue distribution conforming to the principle of order in color harmony or not. The controller 11 identifies a hue distribution pattern having a hue distribution closest to that of the input image among hue distribution patterns conforming to the principle of order.

Next, the controller 11 presents an evaluation result for the input image (Step S6). Specifically, the controller 11 causes the display 13 to display an attentional property evaluation result, a first impression evaluation result, and a second impression evaluation result.

Figure 6:
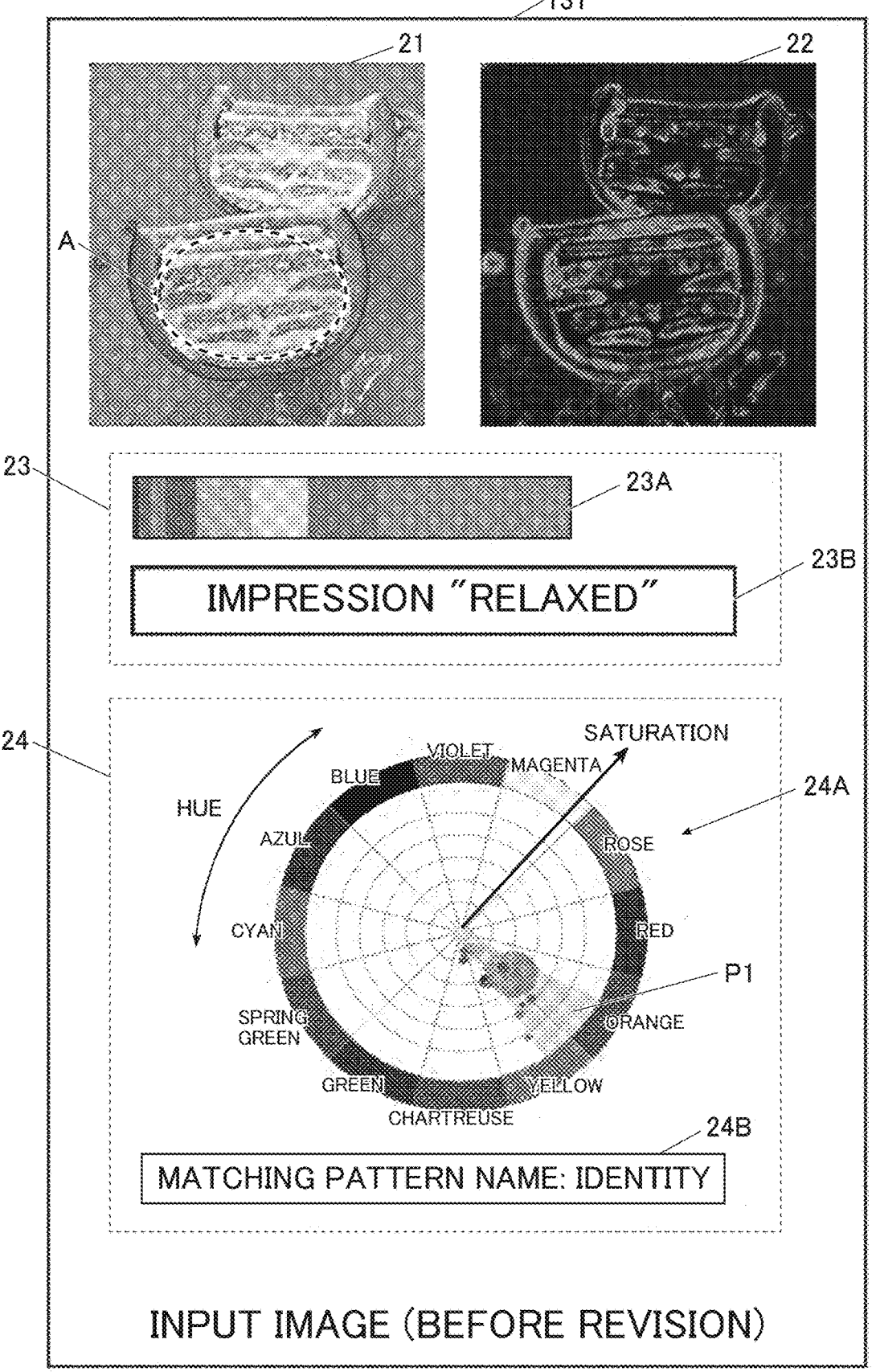
FIG. 6 shows an example of an input image evaluation result screen.

FIG. 6 shows an example of an input image evaluation result screen 131 displayed on the display 13. The input image evaluation result screen 131 includes an image region 21, an attentional property evaluation result region 22, a first impression evaluation result region 23, and a second impression evaluation result region 24.

In the image region 21, an input image serving as an evaluation target (before revision) is displayed. In the image region 21, the attentional target region A designated by the user may be displayed.

In the attentional property evaluation result region 22, an attentional property evaluation result (saliency map) for the input image is displayed. The saliency map represents each pixel with a color and thickness in accordance with the degree of saliency (attentional property) and indicates a portion having a high saliency in red, for example. Note that it can be freely set which color is assigned to the degree of the saliency.

In the first impression evaluation result region 23, the first impression evaluation result for the input image is displayed. The first impression evaluation result region 23 includes a color combination pattern region 23A, and an impression word region 23B.

In the color combination pattern region 23A, a color combination pattern (dominant color) obtained by analyzing the input image is displayed. The controller 11 displays a cumulative bar chart that indicates each color obtained by applying the subtractive color process to the input image as the area ratio of the color in the image, in the color combination pattern region 23A.

In the impression word region 23B, the impression word estimated from the input image, and the similarity about the impression word are displayed. Here, in the impression word region 23B, an impression word "RELAXED" and a similarity "97.54%" are displayed.

In the second impression evaluation result region 24, the second impression evaluation result for the input image is displayed. The second impression evaluation result region 24 includes a hue distribution region 24A, and a matching pattern name region 24B.

In the hue distribution region 24A, a color wheel graph that plots the saturation and hue of each pixel of the input image is displayed. On the color wheel graph, hues are arranged along the circumferential direction of the circle, and saturations are defined in the radial direction of the circle. Specifically, the center of the circle corresponds to an achromatic color, and the saturation increases toward the outside of the circle. On the color wheel graph, the color of a plotted point (circle) indicates the color in the image, and the size of the plotted point (circle) indicates the number of colors (the number of pixels) in the image.

In the matching pattern name region 24B, the hue distribution pattern identified from the color wheel graph is displayed.

As shown in the hue distribution region 24A, the colors of the input image are concentrated in hues of yellow and orange. The hue distribution of the input image matches a hue distribution pattern "identity" in the principle of order of color harmony. The "identity" is a hue distribution pattern indicating a color combination using only the same hue.

On the color wheel graph in the hue distribution region 24A, a sector region P1 indicating a hue distribution corresponding to the identified hue distribution pattern is displayed.

Next, the controller 11 causes the display 13 to display the input image and accepts designation of a background region B in the input image, by operation by the user through the operation receiver 12 (Step S7). If the input image has already been displayed on the display 13 in step S6, the user may designate the background region B on this image. Alternatively, the controller 11 may obtain a region corresponding to a color occupying the largest range after the subtractive color process is applied to the colors in the entire image, and adopt this region as the background region B.

Next, the controller 11 performs attentional property improvement image processing (Step S8).

Figure 7:
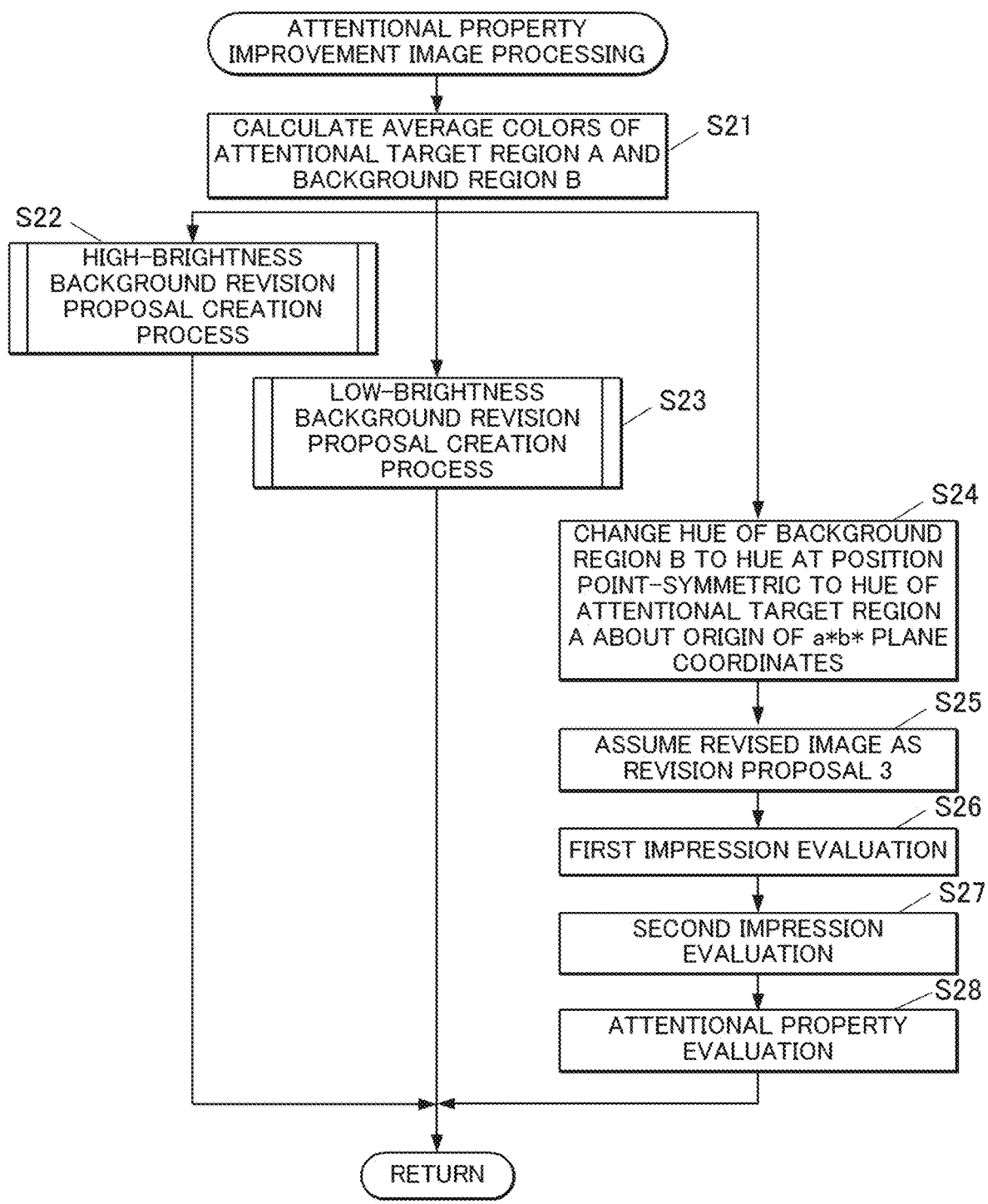
FIG. 7 is a flowchart showing attentional property improvement image processing.

Here, referring to FIG. 7, the attentional property improvement image processing is described.

The controller 11 calculates the average color of the attentional target region A, and the average color of the background region B (Step S21).

Next, the controller 11 performs a high-brightness background revision proposal creation process (Step S22), and a low-brightness background revision proposal creation process (Step S23).

Figure 8:
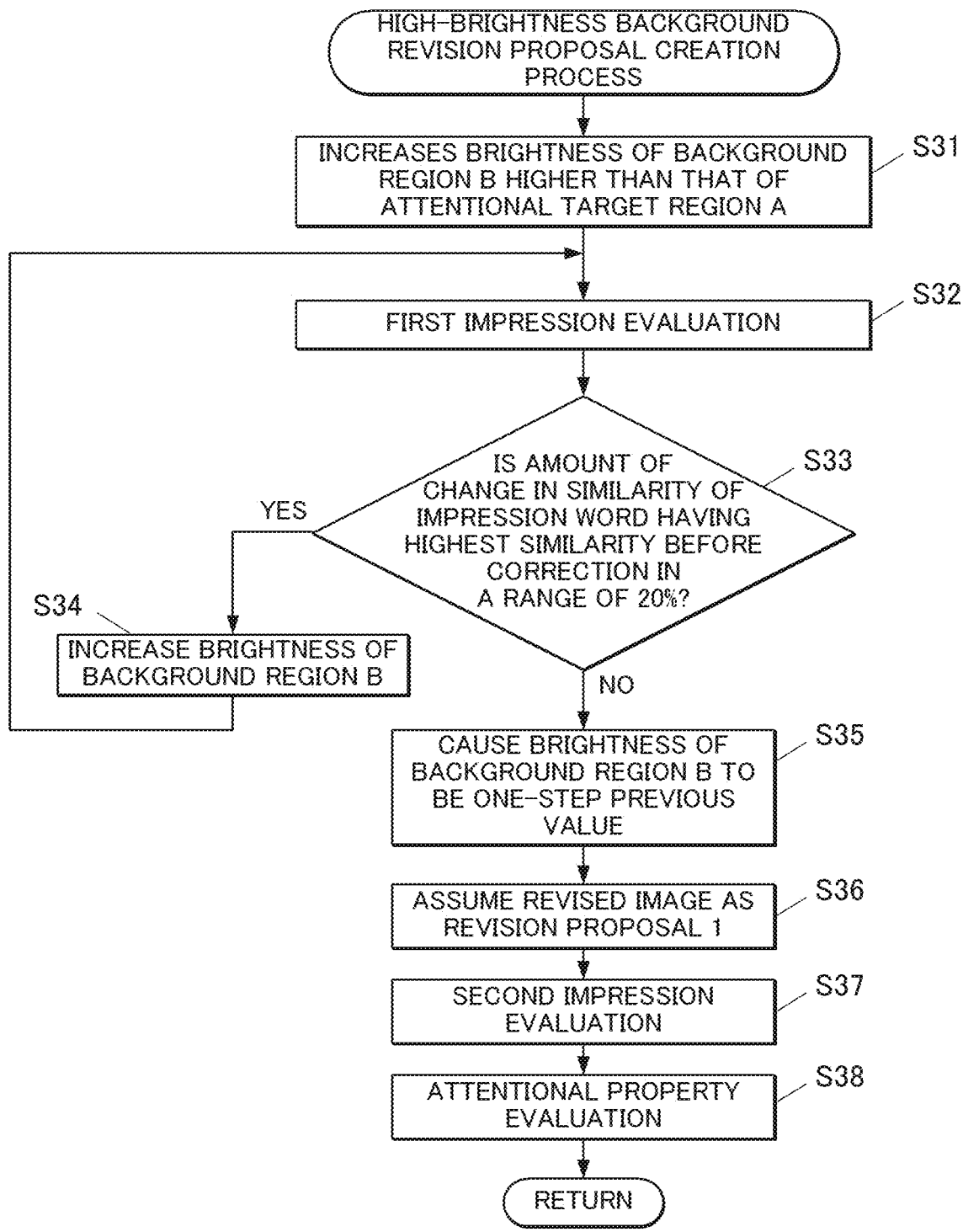
FIG. 8 is a flowchart showing a high-brightness background revision proposal creation process.

In the high-brightness background revision proposal creation process (Step S22), as shown in FIG. 8, the controller 11 increases the brightness of the background region B in the input image by one step higher than that of the attentional target region A (S31). The one step has a value that serves as a stage for changing the brightness of the background region B. That is, the controller 11 generates an image where the brightness of the background region B is increased higher than the brightness of the attentional target region A.

Next, the controller 11 applies the first impression evaluation to the revised image (image including the background region B with the increased brightness) (Step S32). This process is similar to the process of Step S4 except that the evaluation target is "revised image".

Next, the controller 11 determines whether the amount of change in similarity of the impression word having the highest similarity before revision among the impression words in the impression association table 151 is in a range of +20% or not (Step S33). That is, the controller 11 determines whether or not with respect to the impression word having the highest similarity in Step S4, the absolute value of the difference between the similarity of the revised image and the similarity of the input image is equal to or less than 20%.

If the amount of change in similarity is in a range of +20% with respect to the impression word having the highest similarity before revision (Step S33: YES), the controller 11 further increases the brightness of the background region B in the revised image by one step (Step S34). That is, the controller 11 generates an image where the brightness of the background region B is further increased.

After Step S34, the processing returns to Step S32.

If the amount of change in similarity is not in the range of +20% with respect to the impression word having the highest similarity before revision in Step S33 (Step S33: NO), the controller 11 causes the brightness of the background region B to be the one-step previous value (Step S35). That is, if the impression largely changes, the controller 11 brings the state to one-step previous state.

Next, the controller 11 assumes a revised image with the brightness of the background region B in the one-step previous state, as a revision proposal 1 (Step S36), and stores the revision proposal 1 in the storage 15.

Next, the controller 11 applies the second impression evaluation (Step S37) and the attentional property evaluation (Step S38) to the image of the revision proposal 1. These processes are similar to the processes of Steps S5 and S3 except that the evaluation target is the revision proposal 1.

The high-brightness background revision proposal creation process is thus finished.

Figure 9:
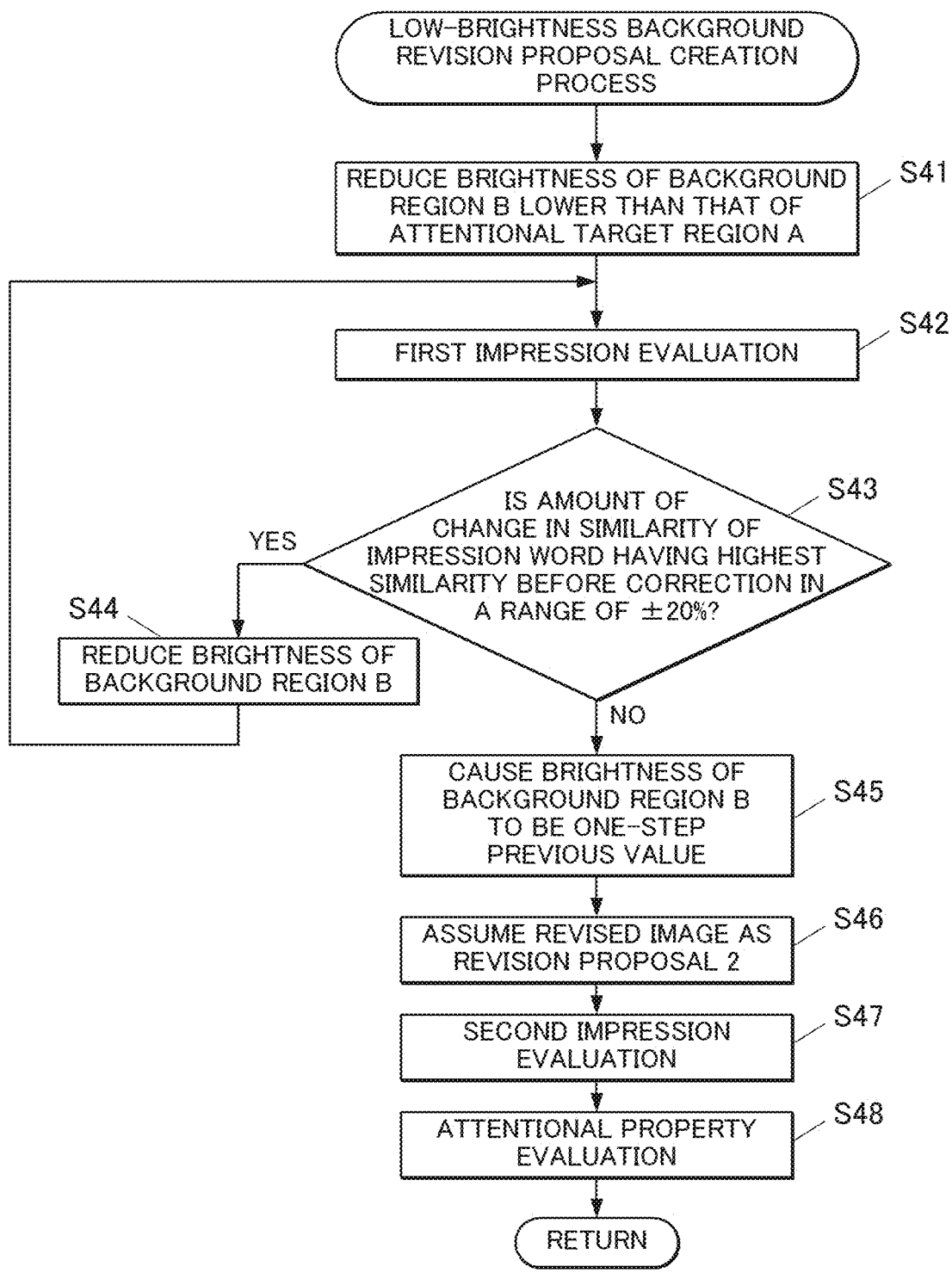
FIG. 9 is a flowchart showing a low-brightness background revision proposal creation process.

In the low-brightness background revision proposal creation process (FIG. 7 Step S23), as shown in FIG. 9, the controller 11 reduces the brightness of the background region B in the input image by one step lower than that of the attentional target region A (Step S41). The one step has a value serves as a stage for changing the brightness of the background region B. That is, the controller 11 generates an image where the brightness of the background region B is reduced lower than the brightness of the attentional target region A.

Next, the controller 11 applies the first impression evaluation to the revised image (image including the background region B with the reduced brightness) (Step S42). This process is similar to the process of Step S4 except that the evaluation target is "revised image".

Next, the controller 11 determines whether the amount of change in similarity of the impression word having the highest similarity before revision among the impression words in the impression association table 151 is in a range of +20% or not (Step S43).

If the amount of change in similarity is in the range of +20% with respect to the impression word having the highest similarity before revision (Step S43: YES), the controller 11 reduces the brightness of the background region B in the revised image further by one step (Step S44). That is, the controller 11 generates an image where the brightness of the background region B is further reduced.

After Step S44, the processing returns to Step S42.

If the amount of change in similarity is not in the range of +20% with respect to the impression word having the highest similarity before revision in Step S43 (Step S43: NO), the controller 11 causes the brightness of the background region B to be the one-step previous value (Step S45).

Next, the controller 11 assumes a revised image with the brightness of the background region B in the one-step previous state, as a revision proposal 2 (Step S46), and stores the revision proposal 2 in the storage 15.

Next, the controller 11 applies the second impression evaluation (Step S47) and the attentional property evaluation (Step S48) to the image of the revision proposal 2. These processes are similar to the processes of Steps S5 and S3 except that the evaluation target is the revision proposal 2.

The low-brightness background revision proposal creation process is thus finished.

In FIG. 7, after Step S21, separately from the processes of Steps S22 and S23, the controller 11 changes the hue of the background region B in the input image to the hue at the position point-symmetric to the hue of the attentional target region A about the origin of $a^*b^*$ plane coordinates (Step S24). That is, the controller 11 generates an image where the hue of the background region B is changed to the color (complementary color) opposite to the attentional target region A on the color wheel.

Next, the controller 11 assumes a revised image as a revision proposal 3 (Step S25) and stores the revision proposal 3 in the storage 15.

Next, the controller 11 applies the first impression evaluation (Step S26), the second impression evaluation (Step S27), and the attentional property evaluation (Step S28) to the image of the revision proposal 3. These processes are similar to the processes of Steps S4, S5, and S3 except that the evaluation target is the revision proposal 3.

After Steps S22, S23, and S28, the processing returns to FIG. 5, and the controller 11 presents an image to which the revision proposal is applied (Step S9). Specifically, the controller 11 causes the display 13 to display the revision proposals 1 to 3.

The controller 11 presents the attentional property evaluation result, the first impression evaluation result, and the second impression evaluation result, with respect to each revision proposal (Step S10).

Figure 10:
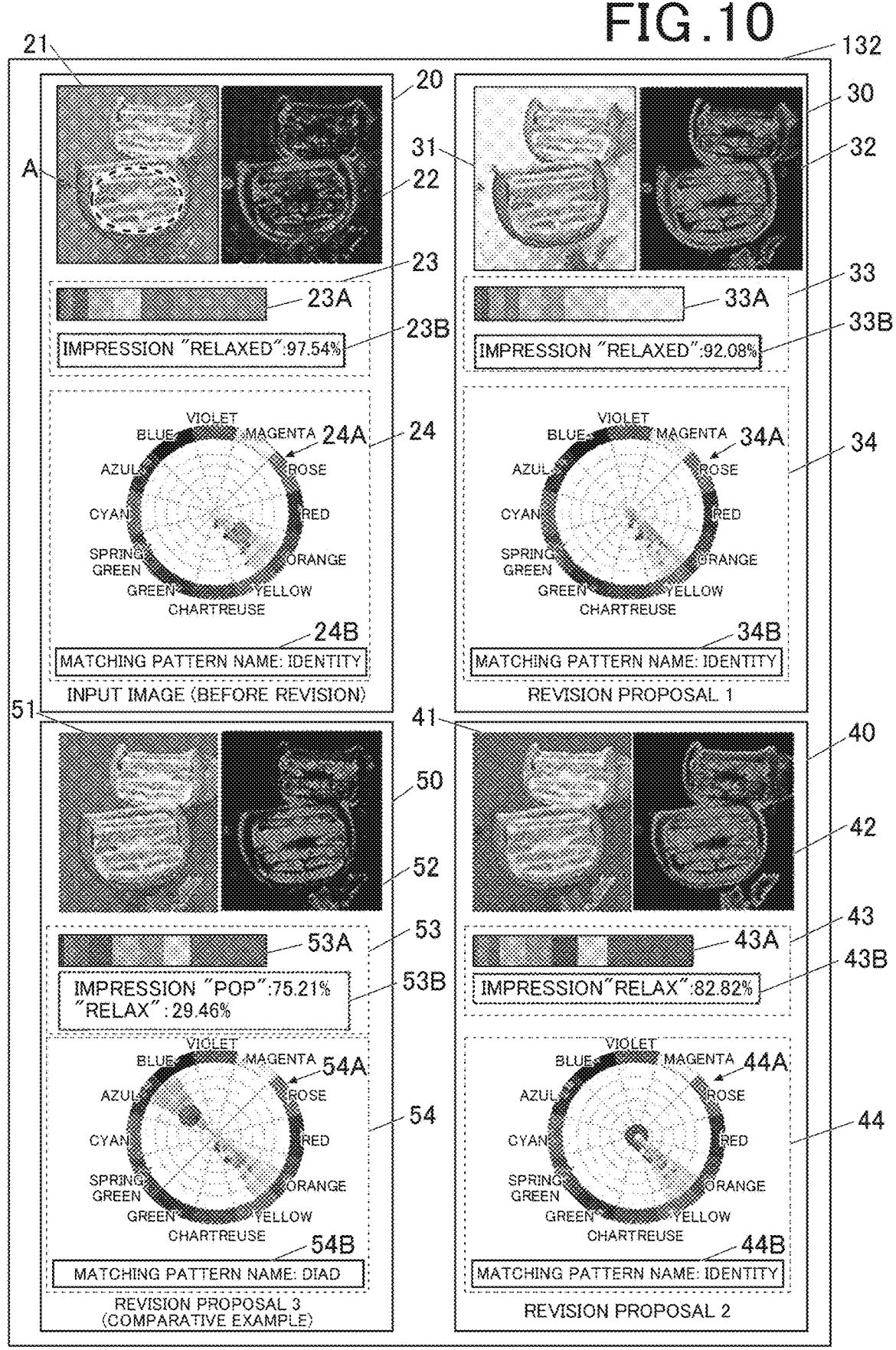
FIG. 10 shows an example of a revision proposal evaluation result screen.

FIG. 10 shows an example of a revision proposal evaluation result screen 132 displayed on the display 13. The revision proposal evaluation result screen 132 includes an input image region 20, a region 30 for the revision proposal 1, a region 40 for the revision proposal 2, and a region 50 for the revision proposal 3.

The configuration of the input image region 20 is similar to that of the input image evaluation result screen 131 (see FIG. 6). Accordingly, the same symbols are assigned, and the description is omitted.

The region 30 for the revision proposal 1 includes an image region 31, an attentional property evaluation result 32, a first impression evaluation result region 33 (a color combination pattern region 33A, and an impression word region 33B), and a second impression evaluation result region 34 (a hue distribution 34A, and a matching pattern name region 34B). The configuration of the region 30 for the revision proposal 1 is similar to that of the input image region 20 except that the evaluation target is the revision proposal 1. Accordingly, analogous symbols are assigned, and the description is omitted.

The region 40 for the revision proposal 2 includes an image region 41, an attentional property evaluation result 42, a first impression evaluation result region 43 (a color combination pattern region 43A, and an impression word region 43B), and a second impression evaluation result region 44 (a hue distribution region 44A, and a matching pattern name region 44B). The configuration of the region 40 for the revision proposal 2 is similar to that of the input image region 20 except that the evaluation target is the revision proposal 2. Accordingly, analogous symbols are assigned, and the description is omitted.

The region 50 for the revision proposal 3 includes an image region 51, an attentional property evaluation result region 52, a first impression evaluation result region 53 (a hue distribution region 53A, and an impression word region 53B), and a second impression evaluation result region 54 (a color combination pattern region 54A, and a matching pattern name region 54B). The configuration of the region 50 for the revision proposal 3 is similar to that of the input image region 20 except that the evaluation target is the revision proposal 3. Accordingly, analogous symbols are assigned, and the description is omitted.

In the revision proposal 1, the brightness of the background region B in the input image is increased, thus increasing the contrast between the attentional target region A and the background region B. Accordingly, as indicated in the attentional property evaluation result 32 in the region 30 for the revision proposal 1, the attentional property of the attentional target region A is increased in comparison with the input image according to the revision proposal 1.

On the other hand, as indicated in the impression word region 33B and the matching pattern name region 34B, the impression word and the hue distribution pattern name are the same as those in the input image, and it is shown that the impression of the image is changed little in comparison with the input image.

In the revision proposal 2, the brightness of the background region B in the input image is reduced, thus increasing the contrast between the attentional target region A and the background region B. Accordingly, as indicated in the attentional property evaluation result 42 in the region 40 for the revision proposal 2, the attentional property of the attentional target region A is increased in comparison with the input image in the revision proposal 2.

On the other hand, as indicated in the impression word region 43B and the matching pattern name region 44B, the impression word and the hue distribution pattern name are the same as those in the input image, and it is shown that the impression of the image is changed little in comparison with the input image.

In the revision proposal 3, the background region B of the input image is made to have a color opposite to that of the attentional target region A on the color wheel, thus increasing the contrast between the attentional target region A and the background region B. Accordingly, as indicated in the attentional property evaluation result 52 in the region 50 for the revision proposal 3, the attentional property of the attentional target region A is increased in comparison with that in the input image in the revision proposal 3.

As indicated in the impression word region 53B, the similarity of an impression word "RELAXED" shared with the input image is reduced, and the similarity of an impression word "POP" that was absent in the input image is increased. As shown in the hue distribution region 54A, the colors in the image of the revision proposal 3 are concentrated in yellow and orange hues, and blue and azure hues. As indicated in the matching pattern name region 54B, the hue distribution of the revision proposal 3 matches the hue distribution pattern of "DIAD" in the principle of order of color harmony and has a result different from that of the input image. The "DIAD" is a hue distribution pattern indicating a combination of colors having a relationship of complementary colors positioned opposite to each other on the color wheel.

The revision proposals 1 and 2 are obtained by determining the degree of improvement in attentional property while confirming the result of the first impression evaluation of the revised image. Specifically, an image where the brightness of the background region B is increased to the maximum while the amount of change in similarity about the impression word (e.g., "RELAXED") of the input image is kept in the predetermined range is assumed as the revision proposal 1. An image where the brightness of the background region B is reduced to the minimum is assumed as the revision proposal 2. The revision proposals 1 and 2 can improve the attentional property without largely changing the impression.

The revision proposal 3 where only the improvement in attentional property is prioritized irrespective of the change in impression of the image is created. The revision proposal 3 is presented for the reference purpose (comparative example) allowing the user to determine whether the impression may be changed.

If the impression is not intended to be largely changed from that of the input image, it is preferable to present only the revision proposals 1 and 2.

On the other hand, in a case in which there is no limitation to the impression intended to be given to the observer by the design image, i.e., in a case in which the greatest object is to allow the image to be recognized, and the impression may be changed only if the attentional property improvement is achieved, the user's options can be expanded by also presenting the revision proposal 3.

Next, the controller 11 accepts selection of any revision proposal from among the presented revision proposals through operation by the user on the operation receiver 12 (Step S11).

The first revision proposal presentation process is thus finished.

As described above, according to the first embodiment, the controller 11 of the design revision apparatus 10 combines a result of the attentional property evaluation with a result of the impression evaluation and presents a design revision proposal about the attentional property or the impression of the input image. Thus, irrespective of presence or absence of a design revising intention by the user, improvement in attentional property or impression of the image can be facilitated.

By selecting the revision proposal that the user intends to adopt from among the presented revision proposals, the revision result intended by the user can be obtained.

The controller 11 presents, as the revision proposal, an attentional property improvement plan that keeps, in a predetermined range, an amount of change in impression of a revised image from that of the input image. Accordingly, the attentional property can be improved so that the region intended to attract intention can further attract intention without largely changing the impression of the design.

For example, the controller 11 presents an improvement plan for improving the attentional property of a region designated by the user in the input image. By designating the region intended by the user to improve the attentional property, the presented revision proposal does not largely deviate from the intention by the user.

If the controller 11 automatically detects a predetermined region (an object region, a character region, etc.) from the input image, an improvement plan for improving the attentional property of the automatically detected predetermined region can be presented. In this case, candidates of regions intended to improve the attentional property can be presented to the user without the need for the user to designate the region.

The controller 11 presents the attentional property improvement plan by changing the color of the background region B in the input image so as to increase the contrast in brightness between the attentional target region A and the background region B without changing the feature of the attentional target region A. Accordingly, without largely changing the impression that the attentional target region A has, the attentional property of the attentional target region A can be improved.

Note that in the first embodiment, the attentional property is revised by changing the color of the background region B so as to increase the contrast of brightness between the attentional target region A and the background region B in the input image. Alternatively, an attentional property improvement plan may be presented by changing the color of the background region B so as to increase the contrast of hues between the attentional target region A and the background region B without changing the feature of the attentional target region A in the input image.

In the first impression evaluation, the controller 11 calculates a similarity between an image feature associated with an impression word and a feature of the evaluation target image, and outputs the impression word associated with the image feature whose calculated similarity is high, and a numerical value of the similarity, as the result of the impression evaluation. Use of the impression association table 151 facilitates to obtain the impression and the degree of the evaluation target image.

Since the revision proposal includes information indicated by characters or text, and revised or improved design proposals, the user can revise the design of the input image by selecting a presented revision proposal.

As the revision proposal by text, a message, for example, "increase the contrast between the region intended to be distinct and the background region" is displayed.

Second Embodiment

A second embodiment to which the present invention is applied is described next. A design revision apparatus in the second embodiment has a configuration similar to the configuration of the design revision apparatus 10 described in the first embodiment, and thus, FIG. 1 is employed, and illustration and description of the configuration are omitted. Hereinafter, a characteristic configuration and processes of the second embodiment are described.

In the second embodiment, a case of presenting a revision proposal that changes the impression of the image while maintaining the attentional property is described.

The controller 11 combines a result of the attentional property evaluation with a result of the impression evaluation and presents a design revision proposal about the attentional property or the impression of the input image.

The controller 11 presents, as the revision proposal, an impression improvement plan that keeps, in a predetermined range, an amount of change in attentional property of a revised image from that of the input image.

For example, the controller 11 presents an impression improvement plan for maintaining the attentional property of a region designated by the user in the input image. The controller 11 may automatically detect a predetermined region (an object region, a character region, etc.) from the input image, and present an impression improvement plan for maintaining the attentional property of the automatically detected predetermined region.

Here, "maintaining the attentional property of the region" includes that the amount of change in attentional property in the region is in a predetermined range.

The controller 11 presents the impression improvement plan by changing the hue distribution of the background region in the target region while preventing change in attentional property of the target region intended to be made distinct from the input image.

Here, "preventing change in attentional property of the target region" includes that the amount of change in attentional property in the target region is in a predetermined range.

The "background region" is a region serving as a background of the target region intended to be made distinct. The background region may be designated by the user. Alternatively, a region corresponding to a color occupying the largest range after the subtractive color process is applied to the colors in the entire image may be adopted as the background region.

Next, the operation is described.

Figure 11:
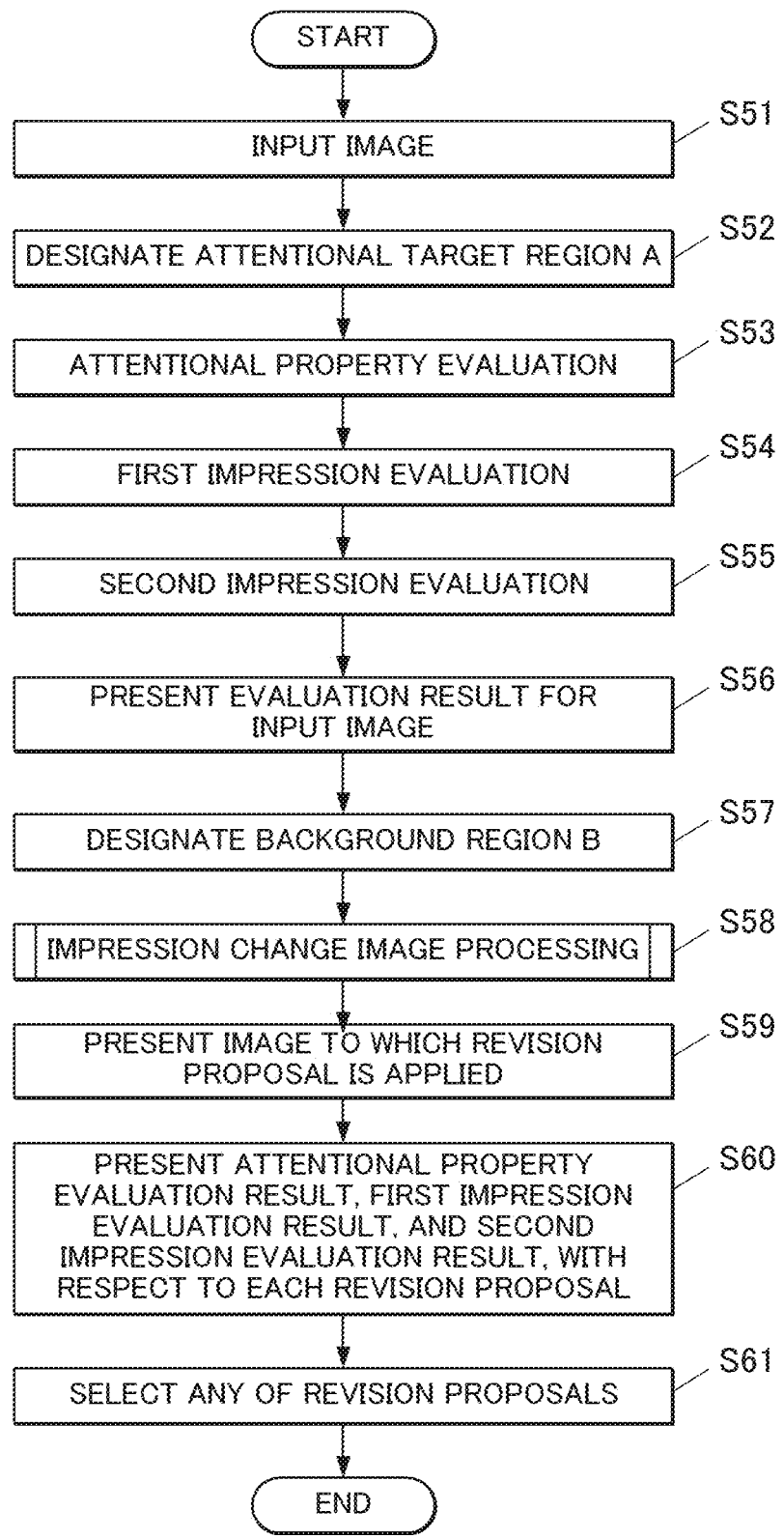
FIG. 11 is a flowchart showing a second revision proposal presentation process executed by the design revision apparatus according to a second embodiment.

FIG. 11 is a flowchart showing a second revision proposal presentation process executed by the design revision apparatus 10 according to the second embodiment. This process is achieved by a software process by cooperation between the CPU of the controller 11 and the program stored in the storage 15.

The second revision proposal presentation process assumes a case where the attentional property of the appealing point is sufficiently secured in the input image, but the idea of design is intended to be expanded based on multiple revision proposals having various impressions.

The processes of steps S51 to S57 are similar to the processes of steps S1 to step S7 in the first revision proposal presentation process (see FIG. 5). Accordingly, the description is omitted.

Figure 12:
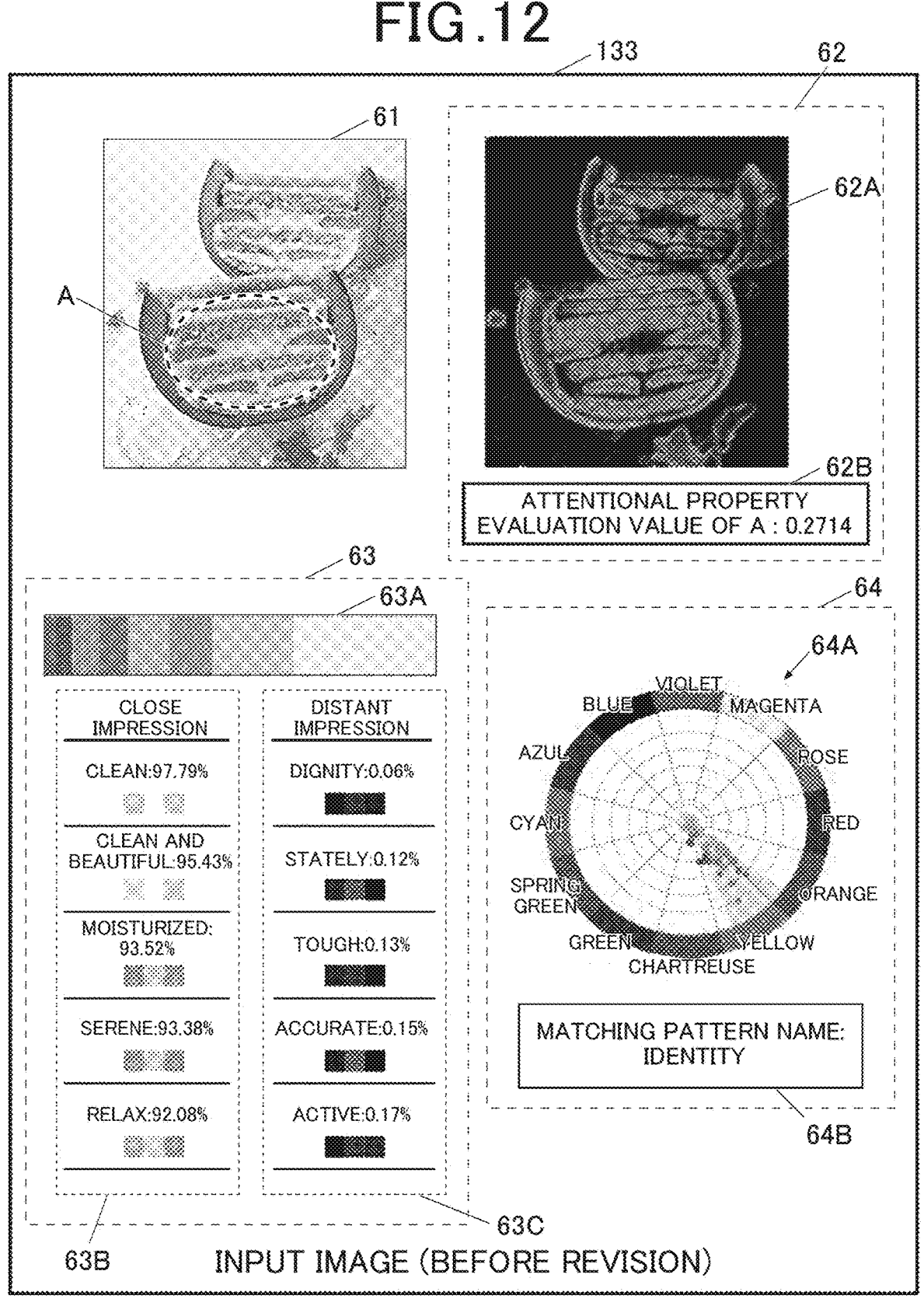
FIG. 12 shows an example of an input image evaluation result screen.

FIG. 12 shows an example of an input image evaluation result screen 133 displayed on the display 13 in Step S56. The input image evaluation result screen 133 includes an image region 61, an attentional property evaluation result region 62, a first impression evaluation result region 63, and a second impression evaluation result region 64.

In the image region 61, an input image serving as an evaluation target (before revision) is displayed. In the image region, the attentional target region A designated by the user may be displayed.

In the attentional property evaluation result region 62, the attentional property evaluation result for the input image is displayed. The attentional property evaluation result region 62 includes a saliency map region 62A, and an attentional property evaluation region 62B.

In the saliency map region 62A, a saliency map created with respect to the input image is displayed.

In the attentional property evaluation region 62B, the attentional property evaluation value of the attentional target region A calculated with respect to the input image is displayed. The attentional property evaluation value is the ratio (U2/U1) of the sum (U2) of the attentional property score values of pixels included in the attentional target region A to the total sum (U1) of attentional property score values calculated for the respective pixels in the evaluation target image. Here, in the attentional property evaluation region 62B, a value of "0.2714" is displayed.

In the first impression evaluation result region 63, the first impression evaluation result for the input image is displayed. The first impression evaluation result region 63 includes a color combination pattern region 63A, a close impression word region 63B, and a distant impression word region 63C.

In the color combination pattern region 63A, a color combination pattern (dominant color) obtained by analyzing the input image is displayed.

In the close impression word region 63B, "close impression word" to the input image, "similarity" of the impression word, and the color combination pattern corresponding to the impression word are displayed. For example, the controller 11 extracts impression words corresponding to the image feature that have higher similarities between the image feature of the impression association table 151 and the feature of the input image, as "close impression words", in an order from those with higher rank numbers. Here, in the close impression word region 63B, impression words and their similarities, such as "CLEAN: 97.79%" and "CLEAN AND BEAUTIFUL: 95.43%", are displayed.

In the distant impression word region 63C, "distant impression word" to the input image, "similarity" of the impression word, and the color combination pattern corresponding to the impression word are displayed. For example, the controller 11 extracts, as "distant impression words", impression words corresponding to the image feature that have lower similarities between the image feature of the impression association table 151 and the feature of the input image, in an order from those with lower rank numbers. Here, in the distant impression word region 63C, impression words and their similarities, such as "DIGNITY: 0.06%" and "STATELY: 0.12%", are displayed.

In the second impression evaluation result region 64, the second impression evaluation result for the input image is displayed. The second impression evaluation result region 64 includes a hue distribution region 64A, and a matching pattern name region 64B.

In the hue distribution region 64A, a color wheel graph that plots the saturation and hue of each pixel of the input image is displayed.

In the matching pattern name region 64B, the hue distribution pattern identified from the color wheel graph is displayed.

Next, the controller 11 performs the impression change image processing (Step S58).

Figure 13:
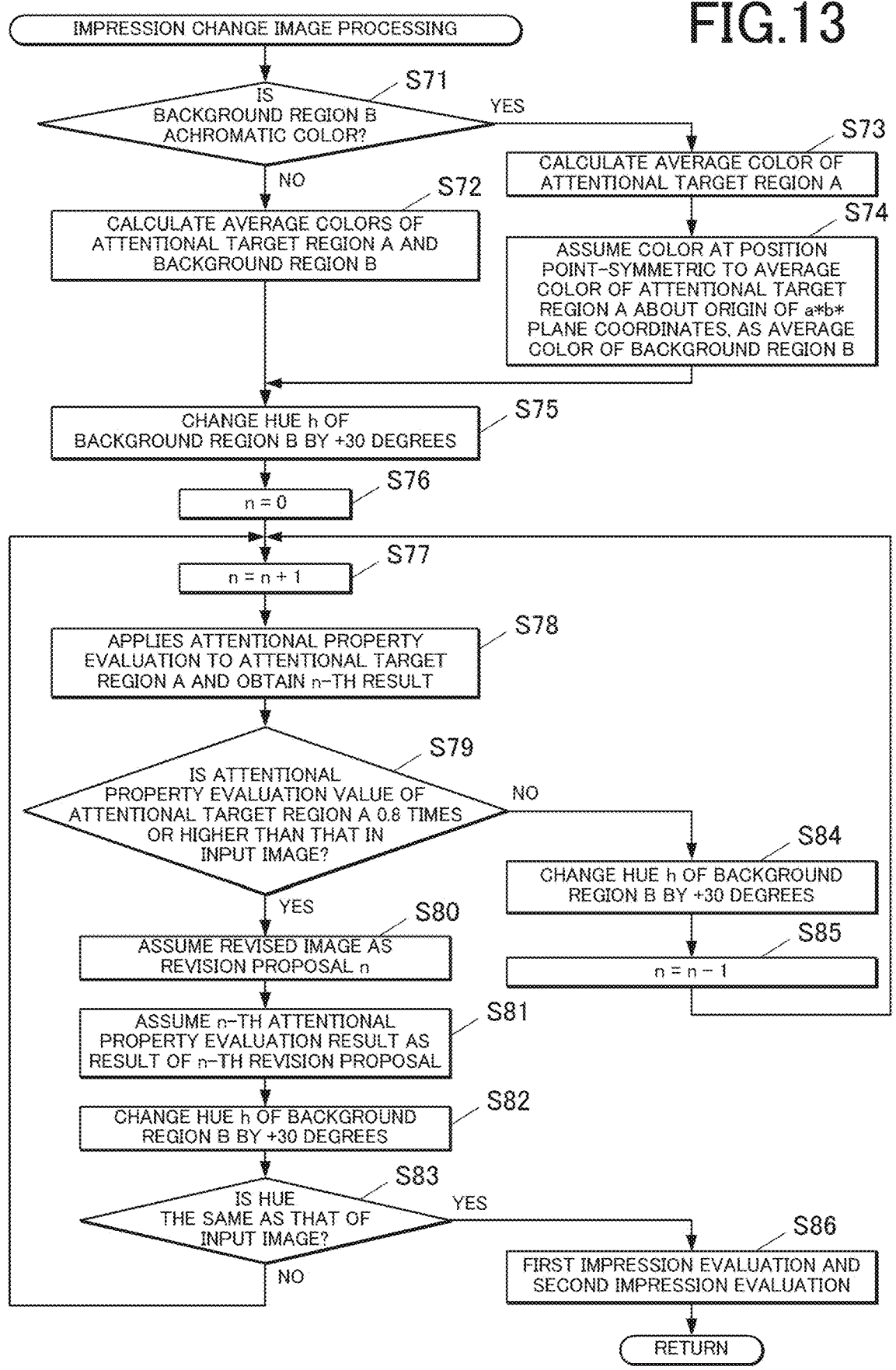
FIG. 13 is a flowchart showing impression change image processing.

Here, referring to FIG. 13, the impression change image processing is described.

The controller 11 determines whether the background region B designated in Step S57 is an achromatic color or not (Step S71). For example, if the saturation of the background region B has a predetermined value or less, the controller 11 determines that the color is an achromatic color.

If the color of the background region B is not an achromatic color (Step S71: NO), the controller 11 calculates the average color of the attentional target region A, and the average color of the background region B (Step S72).

If the background region B has an achromatic color in Step S71 (Step S71: YES), the controller 11 calculates the average color of the attentional target region A (Step S73). Next, the controller 11 assumes the color at the position point-symmetric to the average color of the attentional target region A about the origin of a*b* plane coordinates, as the average color of the background region B (Step S74). If the background region B has an achromatic color, the hue of the background region B cannot be changed. Accordingly, the initial hue of the background region B is moved to a color (complementary color) opposite to that of the attentional target region A on the color wheel.

After Step S72 or S74, the controller 11 changes the hue h of the background region B in the input image by +30 degrees in the L*C*h color space (Step S75). That is, the controller 11 generates an image where the hue h of the background region B is changed.

Here, n=0 is assumed (Step S76).

Next, the controller 11 adds one to n (Step S77).

Next, the controller 11 applies the attentional property evaluation to the attentional target region A in the revised image (image where the hue h of the background region B is changed) and obtains an n-th attentional property evaluation result (Step S78). This process is similar to the process of Step S3 of the first revision proposal presentation process (see FIG. 5) except that the evaluation target is "revised image".

Next, the controller 11 determines whether the attentional property evaluation value of the attentional target region A in the revised image is 0.8 times or higher of the attentional property evaluation value of the attentional target region A in the input image or not (Step S79).

If the attentional property evaluation value of the attentional target region A in the revised image is 0.8 times or higher of the attentional property evaluation value of the attentional target region A in the input image (Step S79: YES), the controller 11 assumes the revised image as a revision proposal n (Step S80) and stores the revision proposal n in the storage 15.

The controller 11 assumes the n-th attentional property evaluation result obtained in the last step, or S78, as the result of the revision proposal n (Step S81).

Next, the controller 11 changes the hue h of the background region B further by +30 degrees in the L*C*h color space (Step S82). That is, the controller 11 generates an image where the hue h of the background region B is further changed.

Next, the controller 11 determines whether the current hue h of the background region B is the same as the hue of the background region B in the input image or not (Step S83). Note that if the hue of the background region B is changed in Step S74, the controller 11 determines whether the current hue h of the background region B is the same as the hue of the background region B changed in Step S74.

If the current hue h of the background region B is not the same as the hue of the background region B in the input image (Step S83: NO), the processing returns to Step S77. That is, until change of the hue of the background region B makes one revolution on the color wheel, the processes are repeated.

If the attentional property evaluation value of the attentional target region A in the revised image is less than 0.8 times of the attentional property evaluation value of the attentional target region A in the input image in Step S79 (Step S79: NO), the controller 11 changes the hue h of the background region B further by +30 degrees in the L*C*h color space (Step S84). That is, the controller 11 generates an image where the hue h of the background region B is further changed.

Next, the controller 11 subtracts one from n (Step S85), and the processing returns to Step S77. That is, if the attentional property of the attentional target region A is largely reduced, the case is not adopted as a revision proposal.

If the current hue h of the background region B is the same as the hue of the background region B in the input image in Step S83 (Step S83: YES), the controller 11 applies the first impression evaluation and the second impression evaluation to each of the revision proposals 1 to n (Step S86). The processes are similar to the processes of Steps S4 and S5 of the first revision proposal presentation process (see FIG. 5) except that the evaluation targets are the revision proposals 1 to n.

The impression change image processing is thus finished.

Returning to FIG. 11, the processes of steps S59 to S61 are similar to the processes of steps S9 to step S11 in the first revision proposal presentation process (see FIG. 5). Accordingly, the description is omitted.

The second revision proposal presentation process is thus finished.

Figure 14:
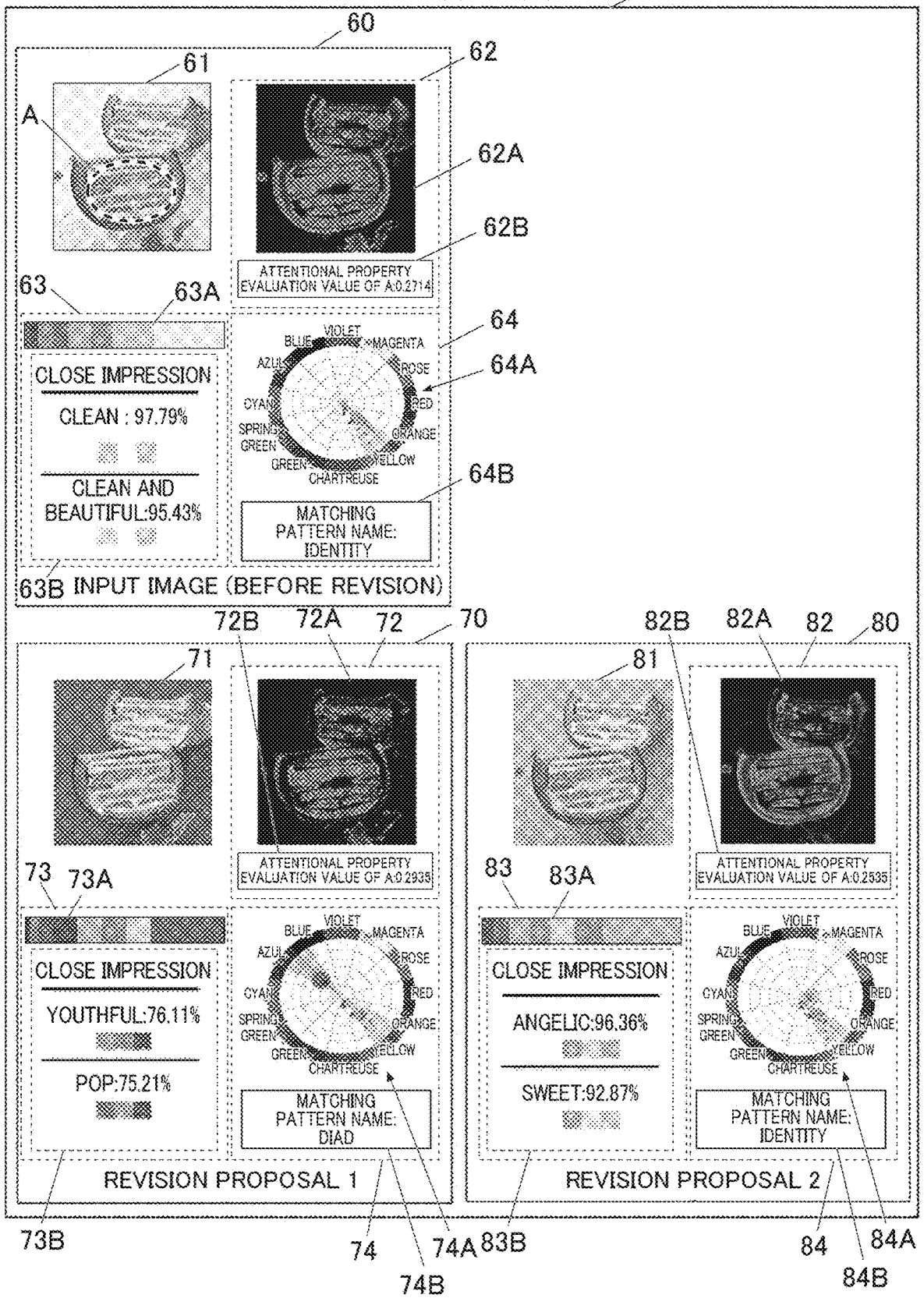
FIG. 14 shows an example of a revision proposal evaluation result screen.

FIG. 14 shows an example of a revision proposal evaluation result screen 134 displayed on the display 13 in Steps S59 and S60. The revision proposal evaluation result screen 134 includes an input image region 60, a region 70 for the revision proposal 1, and a region 80 for the revision proposal 2.

The configuration of the input image region 60 is basically similar to that of the input image evaluation result screen 133 (see FIG. 12). Accordingly, the same symbols are assigned, and the description is omitted. Note that in the input image region 60, the distant impression word region 63C is not included in the first impression evaluation result region 63.

Note that it can be freely set which number of impression words with the highest similarities are presented as impression words estimated by the first impression evaluation (close impression words). In FIG. 14, no distant impression word is displayed. Alternatively, distant impression words may be displayed with the close impression words.

The region 70 for the revision proposal 1 includes an image region 71, an attentional property evaluation result region 72 (an saliency map region 72A and an attentional property evaluation result region 72B), a first impression evaluation result region 73 (a color combination pattern region 73A, and a close impression word region 73B), and a second impression evaluation result region 74 (a hue distribution region 74A, and a matching pattern name region 74B). The configuration of the region 70 for the revision proposal 1 is similar to that of the input image region 60 except that the evaluation target is the revision proposal 1. Accordingly, analogous symbols are assigned, and the description is omitted.

The region 80 for the revision proposal 2 includes an image region 81, an attentional property evaluation result region 82 (a saliency map region 82A and an attentional property evaluation value region 82B), a first impression evaluation result region 83 (a color combination pattern region 83A and a close impression word region 83B), and a second impression evaluation result region 84 (a hue distribution region 84A and a matching pattern name region 84B). The configuration of the region 80 for the revision proposal 2 is similar to that of the input image region 60 except that the evaluation target is the revision proposal 2. Accordingly, analogous symbols are assigned, and the description is omitted.

As indicated in the close impression word region 73B in the region 70 for the revision proposal 1, according to the revision proposal 1, "YOUTHFUL: 76.11%" and "POP: 75.21%" are rated high, thus showing that the impression word is largely changed in comparison with the input image.

As indicated in the matching pattern name region 74B, the hue distribution of the revision proposal 1 matches the hue distribution pattern of "DIAD" in the principle of order of color harmony and is a result different from that of the input image.

On the other hand, as indicated in the attentional property evaluation value region 72B, according to the revision proposal 1, the attentional property evaluation value of the attentional target region A is "0.2935", which maintains a level substantially identical to that of the input image.

As indicated in the close impression word region 83B in the region 80 for the revision proposal 2, according to the revision proposal 2, "ANGELIC: 96.36%" and "SWEET: 92.87%" are rated high, thus showing that the impression word is largely changed in comparison with the input image.

On the other hand, as indicated in the attentional property evaluation value region 82B, according to the revision proposal 2, the attentional property evaluation value of the attentional target region A is "0.2535", which maintains a level substantially identical to that of the input image.

In FIG. 14, two revision proposals "where the attentional property is not largely changed but the impression is changed" are presented. Images with three impressions in which the attentional property of the appealing point (attentional target region A) is maintained and which include the input image are presented. Accordingly, for example, such presentation is effective to develop a series of articles.

The revision proposals 1 and 2 are obtained by changing the impression while confirming the result of the attentional property evaluation of the revised image. Specifically, a variation in which the attentional property of the attentional target region A in the input image is not too low but the hue is different is adopted as a revision proposal.

As described above, similar to the first embodiment, the second embodiment can facilitate improvement in attentional property or impression of the image.

The controller 11 presents, as the revision proposal, an impression improvement plan that keeps, in a predetermined range, an amount of change in attentional property of a revised image from that of the input image. Accordingly, the impression of the design can be improved without largely changing the attentional property of the design.

For example, the controller 11 presents an impression improvement plan for maintaining the attentional property of a region designated by the user in the input image. By designating the region intended by the user to maintain the attentional property, the presented revision proposal does not largely deviate from the intention by the user.

If the controller 11 automatically detects a predetermined region (an object region, a character region, etc.) from the input image, an impression improvement plan for maintaining the attentional property of the automatically detected predetermined region can be presented. In this case, the need of designation of the region by the user is negated.

The controller 11 presents the impression improvement plan by changing the hue distribution of the background region B while preventing change in attentional property of the attentional target region A with respect to the input image. Accordingly, the impression of the design can be improved without largely changing the attentional property of the attentional target region A.

Note that in the second embodiment, the impression is revised by changing the "hue distribution" of the background region B with respect to the input image. Alternatively, the controller 11 may present the impression improvement plan by changing the "brightness distribution" of the background region B while preventing change in attentional property of the target region (attentional target region A) intended to be made distinct from the input image. The controller 11 may present the impression improvement plan by changing the hue distribution or brightness distribution of "entire input image" while preventing change in attentional property of the attentional target region A with respect to the input image. The controller 11 may present the impression improvement plan by changing the hue distribution or brightness distribution of "attentional target region A" while preventing change in attentional property of the attentional target region A with respect to the input image.

In Step S79, the impression change image processing (see FIG. 13) determines whether the attentional property evaluation value of the attentional target region A in the revised image is 0.8 times or higher of the attentional property evaluation value of the attentional target region A in the input image or not. That is, a limitation on the amount of change in attentional property is provided only in the direction of reducing the attentional property evaluation value. However, a limitation on the amount of change in attentional property may be provided also in the direction of increasing the attentional property evaluation value.

Instead of Step S79, it may be determined whether the absolute value of the difference between the attentional property evaluation value of the attentional target region A in the revised image and the attentional property evaluation value of the attentional target region A in the input image is in a predetermined range or not.

Third Embodiment

A third embodiment to which the present invention is applied is described next.

A design revision apparatus in the third embodiment has a configuration similar to the configuration of the design revision apparatus 10 described in the first embodiment, and thus, FIG. 1 is employed, and illustration and description of the configuration is omitted. A characteristic configuration and processing of the third embodiment are described below.

In the second impression evaluation, the controller 11 determines whether the input image has a color combination conforming to color harmony or not.

When the color combination of the input image includes a color not conforming to the color harmony, the controller 11 presents an impression improvement plan by displaying a region (hereinafter, also called a non-conforming region) corresponding to the non-conforming color in the input image so as to be discriminable from another region. The discriminable display method may be, for example, overlay displaying on the input image by coloring the non-conforming region, overlaying a predetermined pattern image on the non-conforming region, or adding a boundary of the non-conforming region.

Next, the operation is described.

Figure 15:
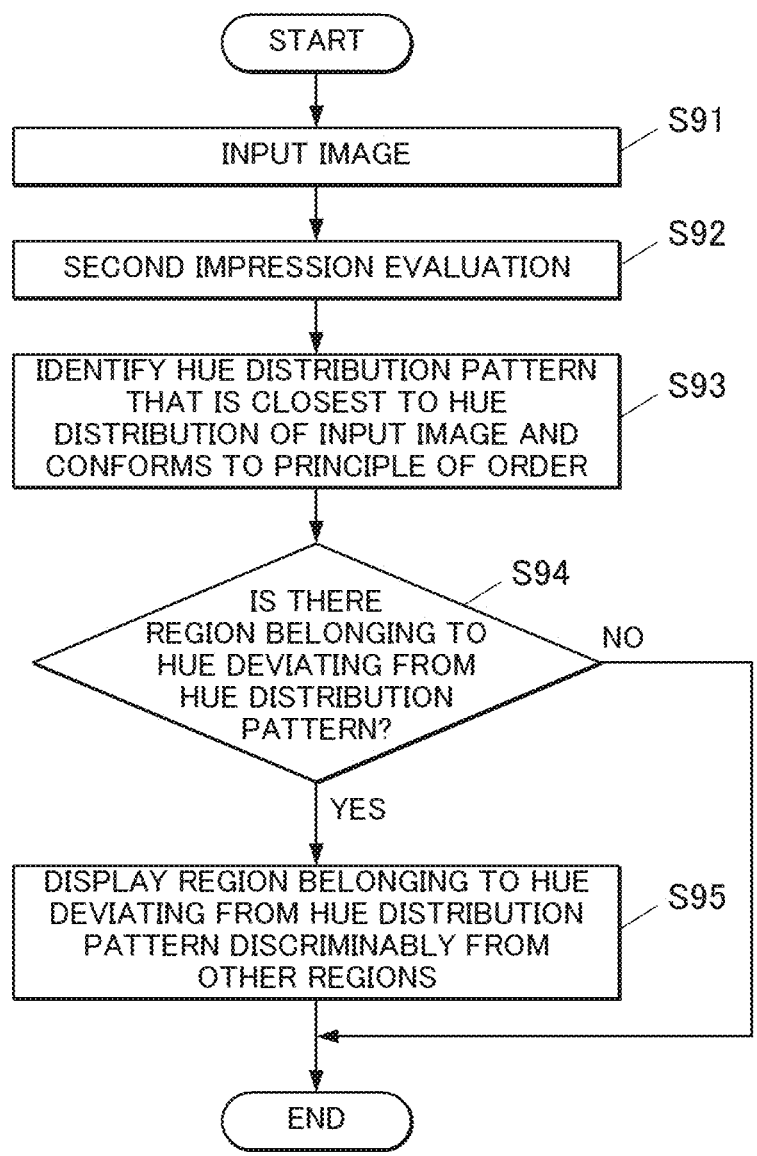
FIG. 15 is a flowchart showing a third revision proposal presentation process executed by a design revision apparatus according to a third embodiment.

FIG. 15 is a flowchart showing a third revision proposal presentation process executed by the design revision apparatus 10 according to the third embodiment. This process is achieved by a software process by cooperation between the CPU of the controller 11 and the program stored in the storage 15.

First, the controller 11 obtains a design image that is input through the communicator 14 and serves as a processing target (Step S91).

Next, the controller 11 performs the second impression evaluation as an impression evaluation that estimates an impression given to the observer by the input image (Step S92). The process is similar to the process of Step S5 in the first revision proposal presentation process (see FIG. 5).

Next, the controller 11 identifies the hue distribution pattern that is closest to the hue distribution of the input image and conforms to the principle of order of color harmony (Step S93). For example, the controller 11 identifies the closest hue distribution pattern from the color wheel graph where the distributions of saturations and hues of pixels of the input image are plotted.

Note that the user may manually identify the hue distribution pattern. In this case, the controller 11 causes the display 13 to display the color wheel graph obtained by analyzing the hue distribution of the input image and accepts input of the hue distribution pattern by the user through the operation receiver 12.

Next, the controller 11 determines whether or not the input image includes a region belonging to a hue deviating from the identified hue distribution pattern (Step S94).

If the input image includes a region belonging to a hue deviating from the identified hue distribution pattern (Step S94: YES), the controller 11 causes the display 13 to display the region belonging to a hue deviating from the identified hue distribution pattern (non-conforming region) discriminably from the other regions of the input image (Step S95).

After Step S95, or in Step S94, if there is not a region belonging to a hue deviating from the identified hue distribution pattern (Step S94: NO), the third revision proposal presentation process is finished.

Note that the case is described in which the third revision proposal presentation process (see FIG. 15) displays the region corresponding to the color not conforming to the principle of order of color harmony in the input image, discriminably from the other regions. There is no limitation to this example. Likewise, also according to, for example, principles of the Judd's color harmony other than the principle of order, and other types of color harmony, the region corresponding to the color not conforming to the color harmony can be clearly indicated.

For simplification of description, in the third revision proposal presentation process, only processes related to the second impression evaluation are described. In actuality, the attentional property evaluation, and the attentional property improvement (or maintaining of the attentional property) can be combined. For example, after the third revision proposal presentation process, the attentional property evaluation may be performed, and a process for improving (or maintaining) the attentional property may be performed. The region intended to be distinct may be designated by the user, or a predetermined region (object regions, character regions, etc.) in the image may be automatically detected.

Figure 16:
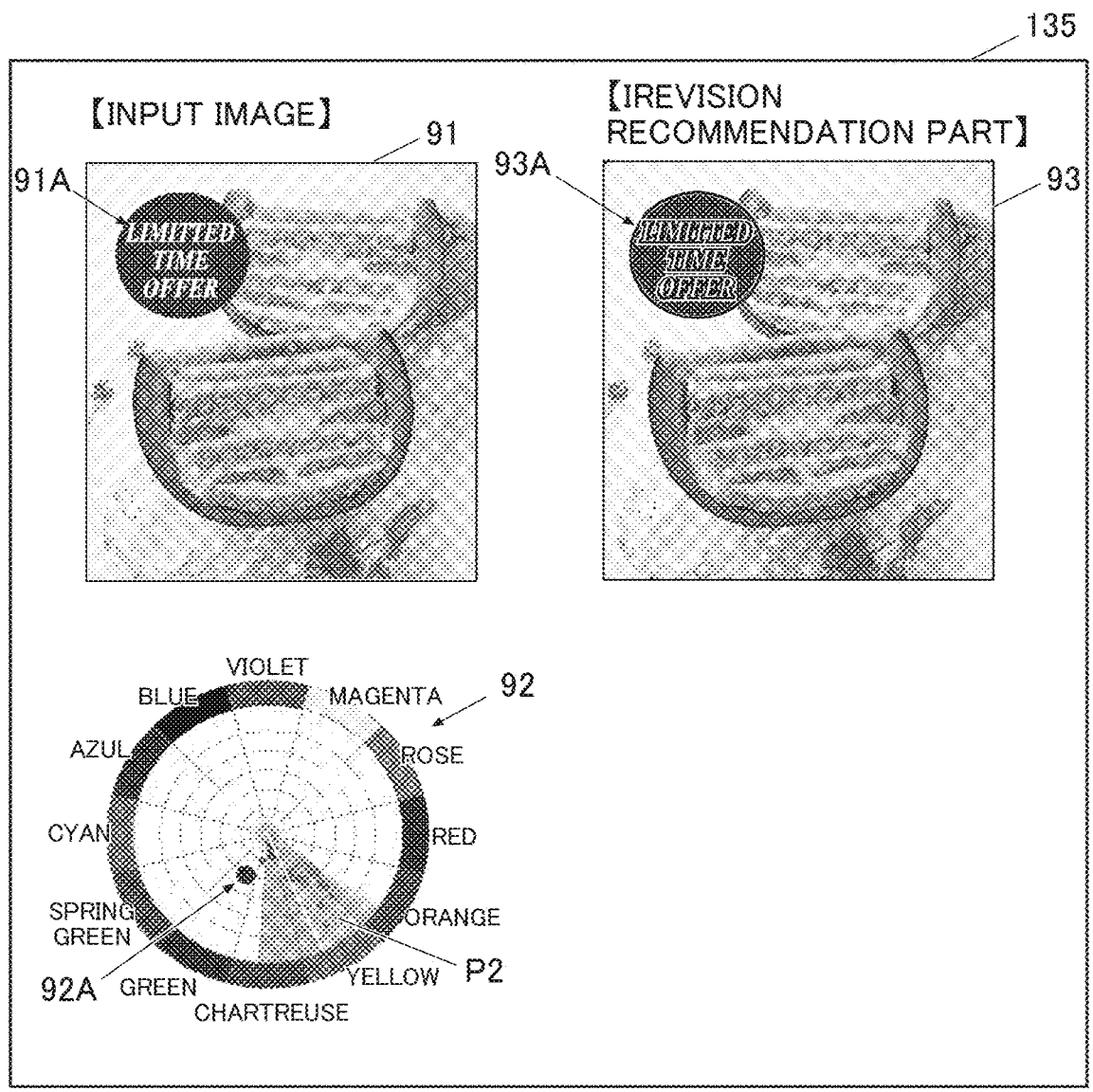
FIG. 16 shows an example of a revision recommendation part presentation screen.

FIG. 16 shows an example of a revision recommendation part presentation screen 135 displayed on the display 13 in Step S95. The revision recommendation part presentation screen 135 includes an input image region 91, an input image impression evaluation result region 92, and a revision proposal region 93.

In the input image region 91, an input image serving as an evaluation target is displayed.

In the input image impression evaluation result region 92, the hue distribution (color wheel graph) of the input image is displayed as the second impression evaluation result for the input image. On the color wheel graph in the input image impression evaluation result region 92, a sector region P2 indicating a hue distribution pattern closest to the hue distribution of the input image is displayed. The hue distribution of the input image is closest to the hue distribution pattern "analogy". The "analogy" is a hue distribution pattern indicating a color combination made up of colors adjacent to each other on the color wheel. The color of a character region 91A of "LIMITED TIME OFFER" in the input image region 91 in the input image is a color 92A deviating from the hue distribution pattern (sector region P2) in the input image impression evaluation result region 92.

In the revision proposal region 93, a revision recommendation part where the color is required to be revised is displayed. For example, a region 93A belonging to the hue deviating from the hue distribution pattern on the input image is colored so that the boundary of the region 93A and contours of characters can be rimmed in red or the like, thus indicating parts to be revised.

The color of the region 93A where the color is considered not to be harmonized is revised by the user, thereby allowing the impression of the image to be improved.

As described above, according to the third embodiment, if there is a color not conforming to the color harmony in the color combination of the input image, the controller 11 displays the non-conforming region in the input image discriminably from the other regions. Accordingly, the user can recognize the non-conforming region in the input image and utilize it to revise the color of the image.

Note that a plurality of revision recommendation parts (non-conforming regions) in the input image may be presented as revision proposals, thus allowing the user to freely select any of these parts and revise them.

Fourth Embodiment

A fourth embodiment to which the present invention is applied is described next.

A design revision apparatus in the fourth embodiment has a configuration similar to the configuration of the design revision apparatus 10 described in the first embodiment, and thus, FIG. 1 is employed, and illustration and description of the configuration are omitted. Hereinafter, a characteristic configuration and processing of the fourth embodiment are described.

In the second impression evaluation, the controller 11 determines whether the input image has a hue distribution conforming to the principle of order in color harmony or not.

When the hue distribution of the input image has a hue not conforming to the principle of order, the controller 11 presents an impression improvement plan by changing a color (RGB gradation values) of a region corresponding to the non-conforming hue in the input image to achieve a hue conforming to the principle of order.

Here, the controller 11 divides pixels in the input image into a plurality of clusters using Delaunay division and determines a direction of revising the color on a cluster-by-cluster basis. Specifically, the convex hull and the Delaunay division are used to cluster pixels in the input image.

For example, the technique described in the following paper can be used for the convex hull and the Delaunay division for clustering.

Tan, Jianchao, Jose Echevarria, and Yotam Gingold. "Efficient palette-based decomposition and recoloring of images via RGBXY-space geometry." ACM Transactions on Graphics (TOG) 37.6 (2018): 1-10.

Tan, Jianchao, Jose Echevarria, and Yotam Gingold. "Palette-based image decomposition, harmonization, and color transfer." arXiv preprint arXiv:1804.01225 (2018).

Next, the operation is described.

Figure 17:
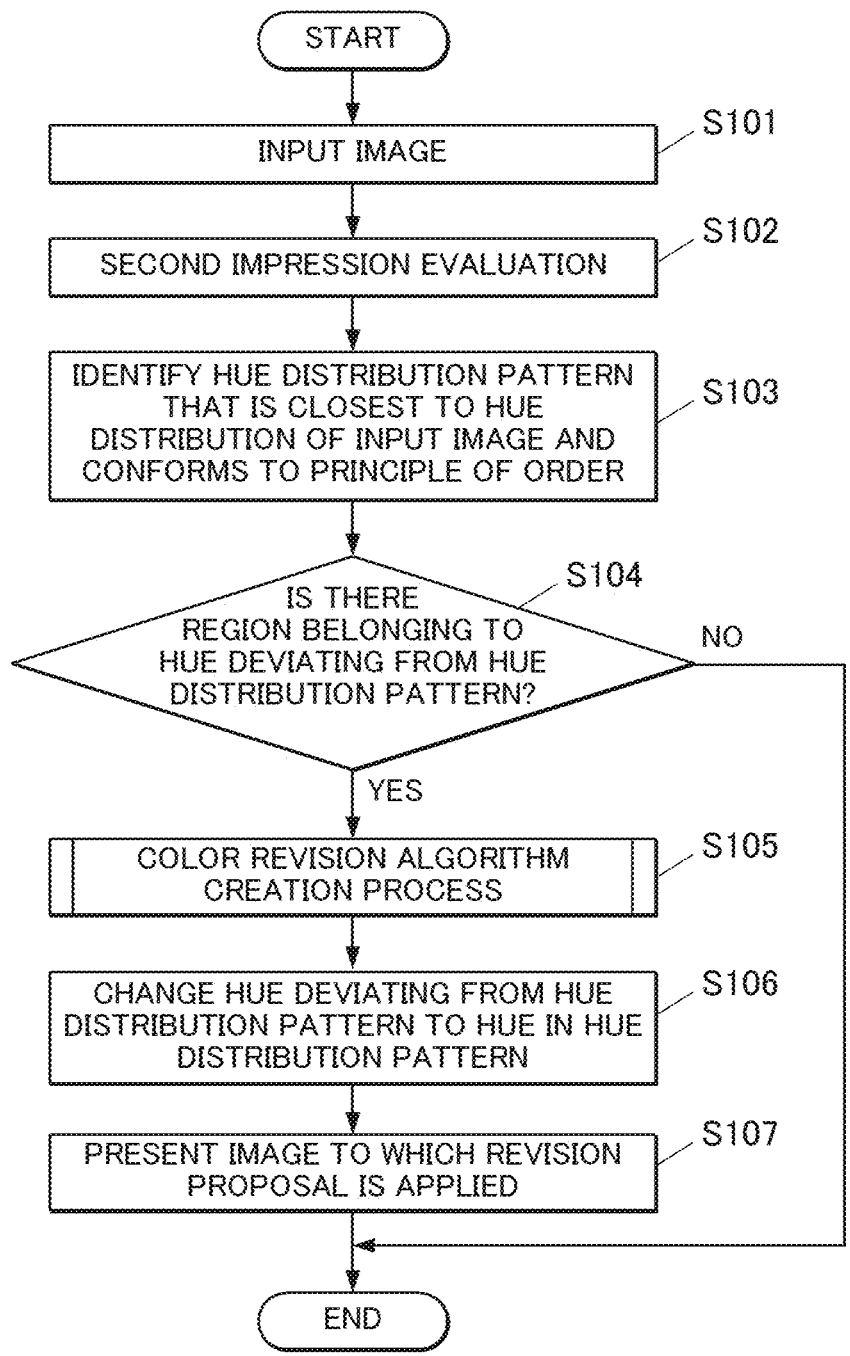
FIG. 17 is a flowchart showing a fourth revision proposal presentation process executed by a design revision apparatus according to a fourth embodiment.

FIG. 17 is a flowchart showing a fourth revision proposal presentation process executed by the design revision apparatus 10 according to the fourth embodiment. This process is achieved by a software process by cooperation between the CPU of the controller 11 and the program stored in the storage 15.

The processes of steps S101 to S104 are similar to the processes of steps S91 to step S94 in the third revision proposal presentation process (see FIG. 15). Accordingly, the description is omitted.

In Step S104, if the input image includes a region belonging to a hue deviating from the identified hue distribution pattern (Step S104: YES), the controller 11 performs the color revision algorithm creation process. The color revision algorithm creation process is a process of creating an association relationship (color conversion table etc.) between the input color and output color in color revision or color editing.

Figure 18:
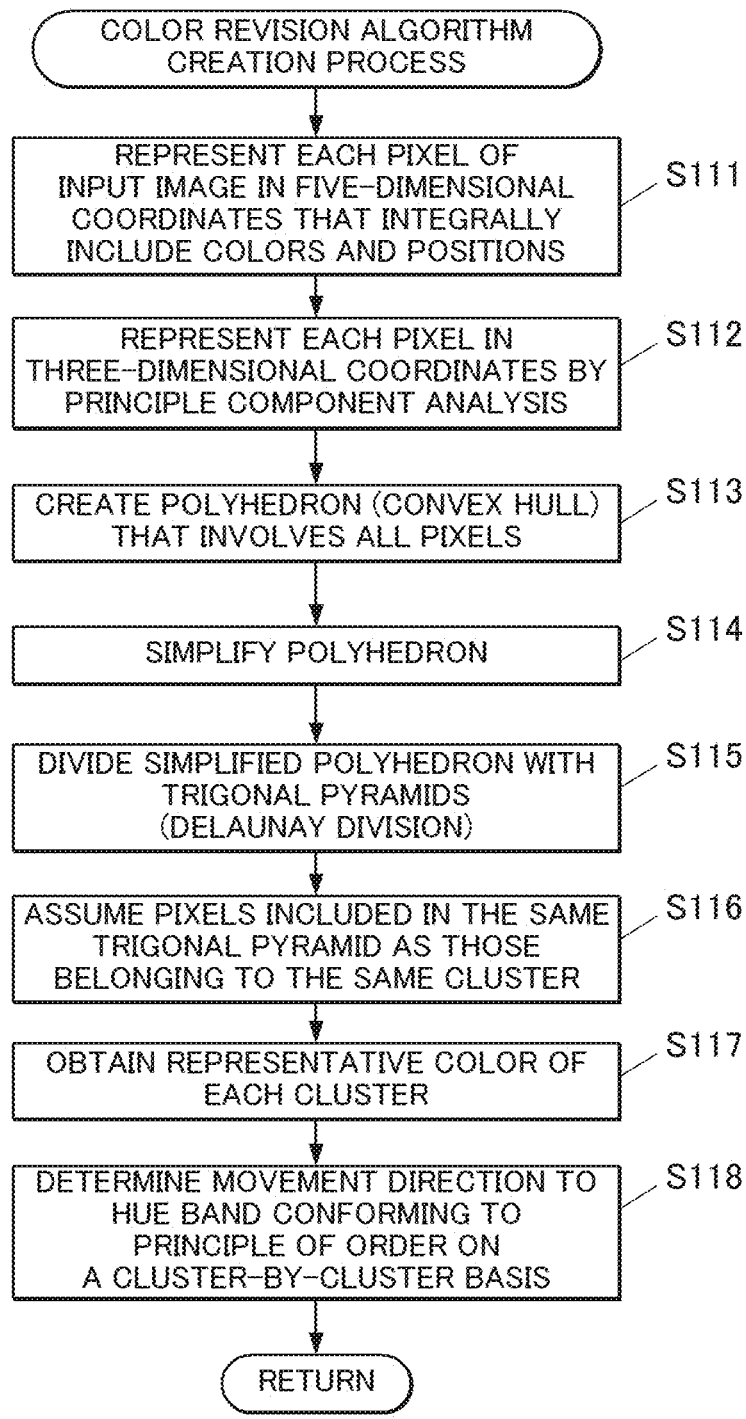
FIG. 18 is a flowchart showing a color revision algorithm creation process.

Here, referring to FIG. 18, the color revision algorithm creation process is described.

The controller 11 represents each pixel of the input image in a five-dimensional coordinates that integrally includes colors and positions (Step S111). Specifically, three directions of RGB that indicate trichromatic gradation values are used as coordinates representing the color, and two directions of XY are used as coordinates representing the position.

Next, the controller 11 represents each pixel in three-dimensional coordinates by the principle component analysis, which is a method of reducing the number of dimensions (Step S112). Specifically, the controller 11 selects three directions that indicate data variation best from among the five-dimensional coordinates (R, G, B, X, Y), and represents each pixel in the three-dimensional coordinates along the selected three directions.

Next, the controller 11 creates a polyhedron (convex hull) that involves all the pixels in a three-dimensional space corresponding to the three-dimensional coordinates in Step S112 (Step S113).

Next, the controller 11 simplifies the polyhedron so as to reduce the number of vertices (Step S114).

Figure 19:
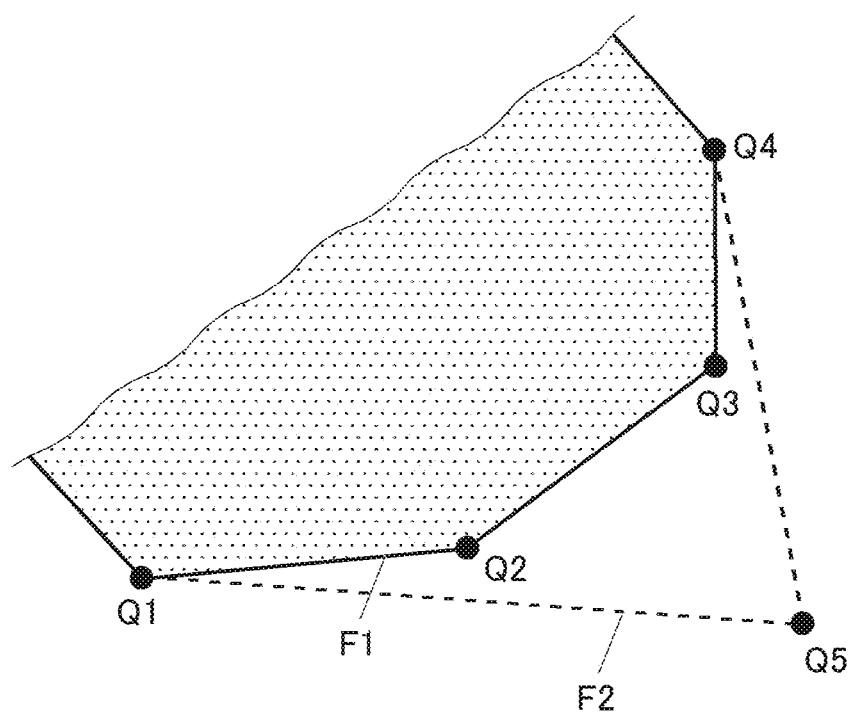
FIG. 19 is a diagram for illustrating simplification of a diagram.

Referring to FIG. 19, the diagram simplification is described. Here, for simplification of description, a polygon F1 is exemplified on a two-dimensional plane. As shown in FIG. 19, one vertex Q5 is added outside of the polygon F1 having vertices Q1 to Q4, and a convex hull is created again, which can remove the two vertices Q2 and Q3. That is, the vertices Q2 and Q3 may be included in a newly created polygon F2. The polygon F2 has a smaller number of vertices than the polygon F1 does.

Next, the controller 11 divides the simplified polyhedron into multiple trigonal pyramids (Delaunay division) (Step S115). The vertices of each trigonal pyramid are four of the vertices of the polyhedron.

Next, the controller 11 assumes the pixels included in the same trigonal pyramid as pixels belonging to the same cluster (Step S116). Thus, the pixels are classified to belong to multiple clusters so that the pixels belonging to the same cluster can be close to each other in terms of the color and position.

Next, the controller 11 obtains the average of colors of pixels belonging to each cluster as a representative color of the cluster (Step S117).

Next, the controller 11 determines the movement direction to a hue band conforming to the principle of order on a cluster-by-cluster basis (Step S118). Specifically, the controller 11 creates a color revision algorithm that converts the representative color of each cluster into the closest hue band among hue bands conforming to the principle of order, on a cluster-by-cluster basis.

The color revision algorithm creation process is thus finished.

Returning to FIG. 17, according to the created color revision algorithm, the controller 11 changes each hue deviating from the hue distribution pattern in the input image into a hue in the hue distribution pattern (Step S106). That is, the controller 11 creates an image (revision proposal) where the impression due to colors is changed.

Next, the controller 11 presents an image to which the revision proposal is applied (Step S107). Specifically, the controller 11 causes the display 13 to display the revision proposal.

After Step S107, or in Step S104, if there is not a region belonging to a hue deviating from the identified hue distribution pattern in the input image (Step S104: NO), the fourth revision proposal presentation process is finished.

Note that for simplification of description, in the fourth revision proposal presentation process (see FIG. 17), only processes related to the second impression evaluation are described. In actuality, the attentional property evaluation and the attentional property improvement (or maintaining of the attentional property) can be combined. For example, after the fourth revision proposal presentation process, the attentional property evaluation may be performed, and a process for improving (or maintaining) the attentional property may be performed. The region intended to be distinct may be designated by the user, or a predetermined region (object regions, character regions, etc.) in the image may be automatically detected.

Figure 20:
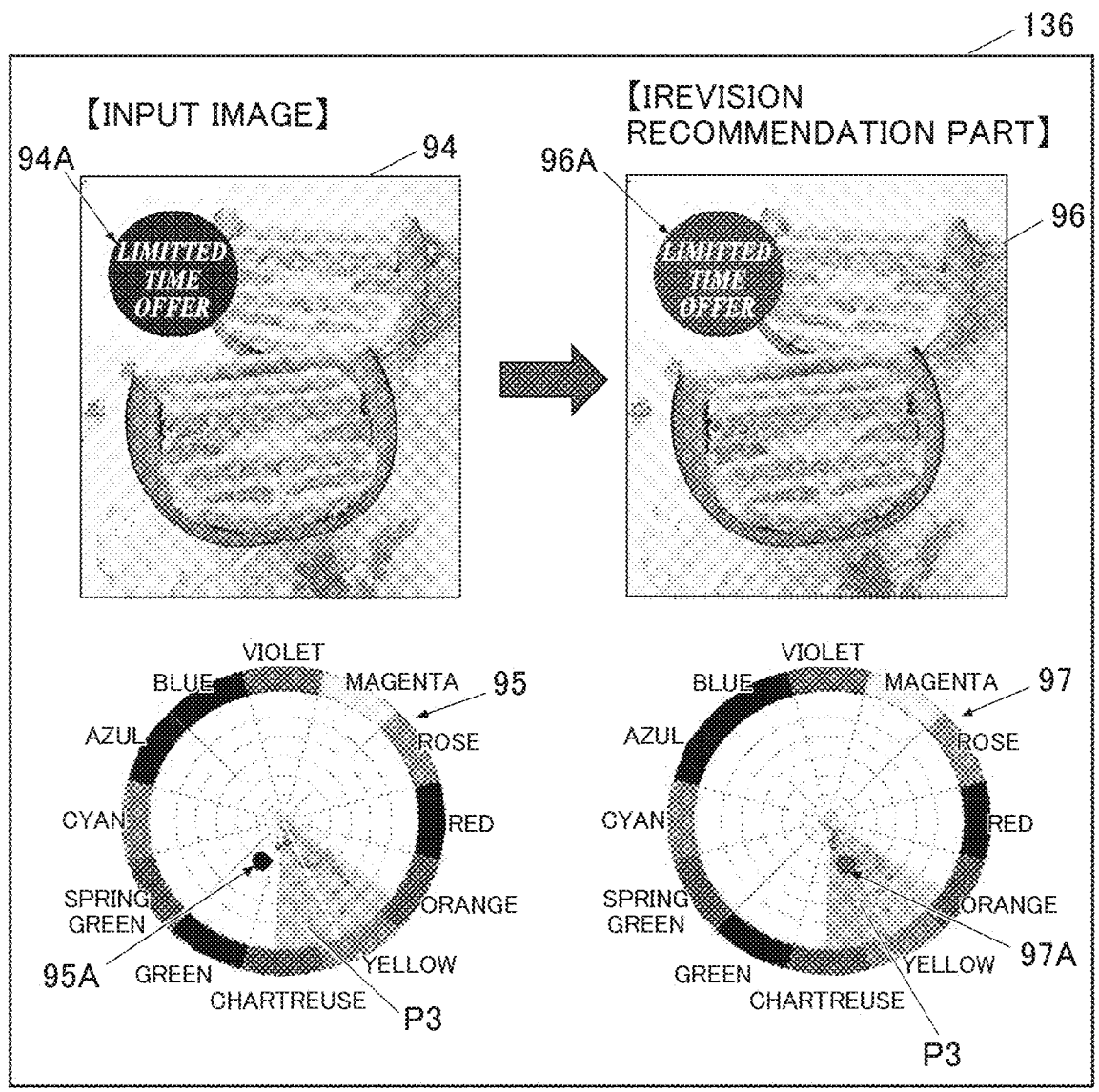
FIG. 20 shows an example of a revision proposal presentation screen.

FIG. 20 shows an example of a revision proposal presentation screen 136 displayed on the display 13 in S107. The revision proposal presentation screen 136 is an example in a case where only color revision based on the second impression evaluation is applied to the input image and is a case where the attentional property improvement is not performed for the input image or a case where the attentional property improvement is not required. The revision proposal presentation screen 136 includes an input image region 94, an input image impression evaluation result region 95, a revised image region 96, and a revised image impression evaluation result region 97.

In the input image region 94, an input image serving as an evaluation target is displayed.

In the input image impression evaluation result region 95, the hue distribution (color wheel graph) of the input image is displayed as the second impression evaluation result for the input image. On the color wheel graph in the input image impression evaluation result region 95, a sector region P3 indicating a hue distribution pattern closest to the hue distribution of the input image is displayed. The hue distribution of the input image is closest to the hue distribution pattern "analogy". The color of a character region 94A of "LIMITED TIME OFFER" in the input image region 94 in the input image is a color 95A deviating from the hue distribution pattern (sector region P3) in the input image impression evaluation result region 95.

In the revised image region 96, the image where the hue is changed (revised image) is displayed.

In the revised image impression evaluation result region 97, the hue distribution (color wheel graph) of the revised image is displayed as the second impression evaluation result for the revised image. The color of a character region 96A of "LIMITED TIME OFFER" in the revised image in the revised image region 96 is thus revised. Accordingly, in the revised image impression evaluation result region 97, a color 97A corresponding to the character region 96A is in the hue distribution pattern indicated by the sector region P3.

As a result of visual evaluation of the revision proposal shown in FIG. 20 by multiple people, the color deviating from the hue distribution pattern is changed to a hue conforming to the hue distribution pattern. Accordingly, it is determined that the colors are harmonized, and a favorable impression is achieved.

As described above, according to the fourth embodiment, when the hue distribution of the input image has a hue not conforming to the principle of order, the controller 11 can present an impression improvement plan by changing a color of a region corresponding to the non-conforming hue in the input image to achieve a hue conforming to the principle of order.

Here, the controller 11 divides pixels in the input image into a plurality of clusters using Delaunay division and determines a direction of revising the color on a cluster-by-cluster basis. Accordingly, an algorithm (color conversion association relationship) for automatic revision such that the hue distribution of the image can be a hue conforming to the principle of order can be created. In the fourth embodiment, based on the result of the second impression evaluation, the impression of the image can be automatically improved.

Note that also in the fourth embodiment, multiple revision proposals may be provided, allowing the user to select any of the revision proposals.

The description in the aforementioned embodiments is examples of the design revision apparatus, program, and design revision method according to the present invention, which is not limited thereto. Detailed components that constitute the apparatus and detailed operation can be changed as appropriate within a range not deviating from the spirit of the present invention.

For example, characteristic processes of the embodiments may be combined.

The order of the attentional property improvement and the impression improvement for the input image may be changeable in accordance with the purpose of the design.

If the purpose of the design emphasizes the impression more than the attentional property, it is preferable to perform the impression improvement before the attentional property improvement. By applying the impression evaluation to the input image beforehand, design elements are pre-adjusted so that the impression of the image can conform to the design concept (impression improvement). Subsequently, when the attentional property is improved, only one time of execution of the process of improving the attentional property without largely changing the impression can complete revision, which can complete the processes with a small number of steps.

If the purpose of the design emphasizes the attentional property more than the impression, it is preferable to perform the attentional property improvement before the impression improvement. By applying the attentional property improvement to the input image beforehand, the revision proposal with the improved attentional property can be presented irrespective of presence or absence of change in impression. Consequently, in addition to the advantage of facilitating the processes, multiple revision proposals where a pattern with the impression being changed and a pattern with the impression is not being changed are combined can be presented. Accordingly, the possibility of providing good designs inconceivable by the user can be improved.

The program for executing each process may be stored in a portable recording medium. Further, as a medium that provides data of the program via a communication line, a carrier wave may be applied.

Although embodiments of the present invention have been described and illustrated in detail, the disclosed embodiments are made for purposes of illustration and example only and not limitation. The scope of the present invention should be interpreted by terms of the appended claims.

The invention claimed is:

1. A design revision apparatus, comprising a hardware processor that:
   applies, to an input image, attentional property evaluation that evaluates a portion easily attracting visual attention;
   performs impression evaluation that estimates an impression given by the input image to an observer; and
   combines a result of the attentional property evaluation with a result of the impression evaluation and presents a design revision proposal about an attentional property or an impression of the input image;
   wherein the hardware processor determines whether the input image has a hue distribution conforming to the principle of order in color harmony or not,
   when the hue distribution of the input image has a hue not conforming to the principle of order, the hardware processor presents an impression improvement plan by changing a color of a region corresponding to the non-conforming hue in the input image to achieve a hue conforming to the principle of order, and
   the hardware processor divides pixels in the input image into a plurality of clusters using Delaunay division and determines a direction of revising the color on a cluster-by-cluster basis.

2. The design revision apparatus according to claim 1, wherein the hardware processor selects a revision proposal that a user intends to adopt, from among the presented revision proposals.

3. The design revision apparatus according to claim 1, wherein the hardware processor presents, as the revision proposal, an attentional property improvement plan that keeps, in a predetermined range, an amount of change in impression of a revised image from that of the input image.

4. The design revision apparatus according to claim 3, wherein the hardware processor presents an improvement plan for improving the attentional property of a region designated by a user in the input image, or a predetermined range automatically detected from the input image.

5. The design revision apparatus according to claim 3, wherein the hardware processor presents the attentional property improvement plan by changing a color of a background region in the input image so as not to change a feature of a target region in which the attentional property is to be improved, and so as to increase a contrast in hue or brightness between the target region and the background region.

6. The design revision apparatus according to claim 1, wherein the hardware processor presents, as the revision proposal, an impression improvement plan that keeps, in a predetermined range, an amount of change in attentional property of a revised image from that of the input image.

7. The design revision apparatus according to claim 6, wherein the hardware processor presents an impression improvement plan to maintain the attentional property of a region designated by a user in the input image, or a predetermined range automatically detected from the input image.

8. The design revision apparatus according to claim 6, wherein the hardware processor presents the impression improvement plan by changing a hue distribution or a brightness distribution of any of the entire input image, a target region, or a background region in the target region, while preventing change in attentional property of the target region intended to be made distinct from the input image.

9. The design revision apparatus according to claim 1, wherein the hardware processor calculates a similarity between an image feature associated with an impression word and a feature of the input image, and outputs the impression word associated with the image feature having high calculated similarity, and a numerical value of the similarity, as the result of the impression evaluation.

10. The design revision apparatus according to claim 1,
    wherein the hardware processor determines whether the input image has a color combination conforming to color harmony or not, and
    when a color combination of the input image includes a color not conforming to the color harmony, the hardware processor presents an impression improvement plan by displaying a region corresponding to the color not conforming to the color harmony in the input image so as to be discriminable from another region.

11. A non-transitory computer-readable recording medium storing a program that causes a computer to perform:

applying, to an input image, attentional property evaluation that evaluates a portion easily attracting visual attention;

performing impression evaluation that estimates an impression given by the input image to an observer; and combining a result of the attentional property evaluation with a result of the impression evaluation to present a design revision proposal about an attentional property or an impression of the input image;

further comprising determining whether the input image has a hue distribution conforming to the principle of order in color harmony or not, when the hue distribution of the input image has a hue not conforming to the principle of order, the hardware processor presents an impression improvement plan by changing a color of a region corresponding to the non-conforming hue in the input image to achieve a hue conforming to the principle of order, and the hardware processor divides pixels in the input image into a plurality of clusters using Delaunay division and determines a direction of revising the color on a cluster-by-cluster basis.

12. A design revision method causing a hardware processor to:

apply, to an input image, attentional property evaluation that evaluates a portion easily attracting visual attention;

perform impression evaluation that estimates an impression given by the input image to an observer;

combine a result of the attentional property evaluation with a result of the impression evaluation to present a design revision proposal about an attentional property or an impression of the input image; and determine whether the input image has a hue distribution conforming to the principle of order in color harmony or not, when the hue distribution of the input image has a hue not conforming to the principle of order, the hardware processor presents an impression improvement plan by changing a color of a region corresponding to the non-conforming hue in the input image to achieve a hue conforming to the principle of order, and the hardware processor divides pixels in the input image into a plurality of clusters using Delaunay division and determines a direction of revising the color on a cluster-by-cluster basis.

* * * * *